(12) United States Patent
Zhu et al.

(10) Patent No.: US 10,955,038 B1
(45) Date of Patent: Mar. 23, 2021

(54) HYDRO-MECHANICAL HYBRID TRANSMISSION DEVICE WITH MULTIPLE POWER DISTRIBUTION MODES AND CONTROL METHOD THEREOF

(71) Applicant: JIANGSU UNIVERSITY, Zhenjiang (CN)

(72) Inventors: Zhen Zhu, Zhenjiang (CN); Yingfeng Cai, Zhenjiang (CN); Long Chen, Zhenjiang (CN); Changgao Xia, Zhenjiang (CN); Xiang Tian, Zhenjiang (CN); Jiangyi Han, Zhenjiang (CN); Xiaodong Sun, Zhenjiang (CN); Dehua Shi, Zhenjiang (CN); Feng Wang, Zhenjiang (CN); Chaochun Yuan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/042,955

(22) PCT Filed: Oct. 23, 2019

(86) PCT No.: PCT/CN2019/112636
§ 371 (c)(1),
(2) Date: Sep. 29, 2020

(30) Foreign Application Priority Data

Oct. 8, 2019 (CN) .......................... 201910949522.9

(51) Int. Cl.
*F16H 47/04* (2006.01)
*B60K 6/36* (2007.10)
(Continued)

(52) U.S. Cl.
CPC ............. *F16H 47/04* (2013.01); *B60K 6/365* (2013.01); *B60K 6/445* (2013.01); *F16H 2037/0886* (2013.01); *F16H 2037/102* (2013.01)

(58) Field of Classification Search
None
See application file for complete search history.

(56) References Cited

U.S. PATENT DOCUMENTS

2002/0107101 A1* 8/2002 Bowen .................. B60K 6/52
475/5
2009/0275437 A1* 11/2009 Kersting .................. B60K 6/26
475/5
(Continued)

FOREIGN PATENT DOCUMENTS

CN 102434647 A 5/2012
CN 102943859 A 2/2013
(Continued)

*Primary Examiner* — Colby M Hansen
(74) *Attorney, Agent, or Firm* — Bayramoglu Law Offices LLC

(57) ABSTRACT

A hydro-mechanical hybrid transmission device and a control method thereof are provided. The device includes an input shaft, a split mechanism, a mechanical transmission assembly, a hydraulic transmission assembly, and an output shaft, wherein the input shaft is connected, through the split mechanism, to the mechanical transmission assembly and the hydraulic transmission assembly that are connected in parallel, and the mechanical transmission assembly and the hydraulic transmission assembly are both connected to the output shaft. The mechanical transmission assembly includes a front planetary-gear-set assembly and a rear planetary-gear-set assembly. The front planetary-gear-set assembly and the rear planetary-gear-set assembly are connected in series. The control method includes three modes of transmission: pure hydraulic transmission, hydro-mechani- (Continued)

cal hybrid transmission, and pure mechanical transmission are implemented through combination and engagement/disengagement of gear-shift components.

11 Claims, 10 Drawing Sheets

(51) Int. Cl.
*B60K 6/44* (2007.10)
*B60K 6/365* (2007.10)
*F16H 37/08* (2006.01)
*F16H 37/10* (2006.01)
*B60K 6/445* (2007.10)

(56) References Cited

U.S. PATENT DOCUMENTS

2015/0184726 A1* 7/2015 Rekow .................. F16H 37/084
 475/5
2016/0167501 A1* 6/2016 Ji .......................... B60K 6/365
 475/5

FOREIGN PATENT DOCUMENTS

| | | |
|---|---|---|
| CN | 103591247 A | 2/2014 |
| CN | 109296724 A | 2/2019 |
| CN | 109723788 A | 5/2019 |
| CN | 109723789 A | 5/2019 |
| DE | 102007000619 A1 | 5/2009 |
| EP | 3168498 A1 | 5/2017 |

* cited by examiner

US 10,955,038 B1

HYDRO-MECHANICAL HYBRID TRANSMISSION DEVICE WITH MULTIPLE POWER DISTRIBUTION MODES AND CONTROL METHOD THEREOF

CROSS REFERENCE TO THE RELATED APPLICATIONS

This application is the national phase entry of International Application No. PCT/CN2019/112636, filed on Oct. 23, 2019, which is based upon and claims priority to Chinese Patent Application No. 201910949522.9, filed on Oct. 8, 2019, the entire contents of which are incorporated herein by reference.

TECHNICAL FIELD

The present invention relates to a transmission device and a control method thereof, and in particular, to a hydro-mechanical hybrid transmission device with multiple power distribution modes and a control method thereof.

BACKGROUND

The transmission device is required to provide a transmission ratio to achieve high torque and low speed when the engineering equipment is started or moves, and is required to provide a transmission ratio to achieve low torque and high speed during transfer of the engineering equipment. Therefore, due to the complex working conditions, the transmission device of the engineering equipment receives higher requirements and has a more complicated structure than the transmission device of an ordinary vehicle; and the transmission device of the engineering equipment has higher requirements on both the transmission ratio and the torque.

The transmission device has a great influence on fuel economy of the engineering equipment, and improves fuel economy by controlling the engine to run in economical working conditions as much as possible. However, the transmission device in the conventional engineering machinery consists of a hydraulic torque converter and a gearbox, commonly known as a torque converter-gearbox system; the hydraulic torque converter is used for forming a non-rigid connection between the engine and the gearbox, and transmitting the speed and torque of the engine to the gearbox; and finally, the transmission ratio of the engineering equipment is changed through shift of the gearbox, which belongs to the conventional mechanical transmission mode and cannot meet the requirements on the transmission ratio in complex working conditions.

At present, the engineering equipment adopts a hydraulic transmission system where an engine drives a hydraulic pump to enable a hydraulic motor to achieve the travelling function. However, the transmission medium of such a hydraulic transmission system is hydraulic oil, and high-pressure oil is produced during the transmission process, which raises high requirements on the sealing performance between the components. The higher requirements on the pressure-resistant performance of the hydraulic components lead to a higher cost of the components; and the transmission efficiency is not high as compared with the mechanical transmission system.

SUMMARY

Objective of the invention: The objective of the present invention is to provide a hydro-mechanical hybrid transmission device with multiple power distribution modes and a control method thereof to solve the above problems. The present invention can provide multiple power distribution modes according to complex working conditions, and make full use of high-efficiency transmission performance of mechanical transmission and stepless speed regulation performance of hydraulic transmission, thereby improving the working efficiency, power performance, and economy of vehicles.

Technical solution: A hydro-mechanical hybrid transmission device with multiple power distribution modes includes an input shaft, a split mechanism, a mechanical transmission assembly, a hydraulic transmission assembly, and an output shaft, wherein the input shaft is connected, through the split mechanism, to the mechanical transmission assembly and the hydraulic transmission assembly that are connected in parallel, and the mechanical transmission assembly and the hydraulic transmission assembly are both connected to the output shaft; the mechanical transmission assembly includes a front planetary-gear-set assembly and a rear planetary-gear-set assembly that are connected in series;

the front planetary-gear-set assembly includes a first clutch, a second clutch, a third clutch, a front planetary-gear-set ring gear, a front planetary-gear-set planet carrier, a front planetary-gear-set sun gear, and a first one-way clutch, wherein the first clutch is arranged between the split mechanism and the front planetary-gear-set ring gear, the second clutch and the third clutch are connected in parallel and are respectively connected to the front planetary-gear-set sun gear, the first one-way clutch is arranged between the third clutch and the front planetary-gear-set sun gear, and the output shaft is connected to the front planetary-gear-set planet carrier;

the rear planetary-gear-set assembly includes a fourth clutch, a rear planetary-gear-set sun gear, a rear planetary-gear-set planet carrier, a rear planetary-gear-set ring gear, a first brake, a second brake, and a second one-way clutch, wherein the fourth clutch is arranged between the split mechanism and the rear planetary-gear-set sun gear, the first brake is connected to the rear planetary-gear-set sun gear, the rear planetary-gear-set planet carrier is connected to the front planetary-gear-set ring gear and is connected to the second brake and the second one-way clutch that are connected in parallel, and the rear planetary-gear-set ring gear is connected to the output shaft.

The hydraulic transmission assembly includes a hydraulic transmission input clutch, a hydraulic transmission input gear pair, a hydraulic pump, a hydraulic oil pipe, a hydraulic motor, a hydraulic transmission output gear pair, and a hydraulic transmission output clutch, wherein the hydraulic pump is connected to the split mechanism through the hydraulic transmission input gear pair, the hydraulic transmission input clutch is arranged between the hydraulic transmission input gear pair and the hydraulic pump, the hydraulic pump is connected to the hydraulic motor through the hydraulic oil pipe, the hydraulic motor is connected to the output shaft through the hydraulic transmission output gear pair, and the hydraulic transmission output clutch is arranged between the hydraulic motor and the hydraulic transmission output gear pair.

The split mechanism includes a split brake, a split mechanism sun gear, a split mechanism planet carrier, and a split mechanism ring gear, wherein the input shaft is connected to the split mechanism ring gear, the split mechanism sun gear is connected to the hydraulic transmission assembly, the split brake is arranged on the split mechanism sun gear, and the split mechanism planet carrier is connected to the mechanical transmission assembly.

Three types of transmission, namely, pure hydraulic transmission, hydro-mechanical hybrid transmission, and pure mechanical transmission are implemented through combination and engagement/disengagement of the brakes and the clutches, and the specific transmission types are as follows:

in pure hydraulic transmission, the first brake, the hydraulic transmission input clutch, the hydraulic transmission output clutch, and the fourth clutch are engaged, while the other clutches and brakes are disengaged; when the fourth clutch and the first brake are engaged, the split mechanism planet carrier is braked; and when the hydraulic transmission input clutch and the hydraulic transmission output clutch are engaged, power passes through the input shaft, the split mechanism ring gear, the split mechanism sun gear, the hydraulic transmission input gear pair, and the input clutch to drive the hydraulic pump to work, the hydraulic pump converts mechanical power into high-pressure oil that passes through the hydraulic pipe to drive the hydraulic motor to work, and the mechanical power output by the hydraulic motor is transmitted through the hydraulic transmission output clutch and the hydraulic transmission output gear pair to the output shaft;

in pure mechanical transmission, the split brake is engaged, the hydraulic transmission input clutch, the hydraulic transmission output clutch, the second brake, and the fourth clutch are disengaged, and shift between gears of different transmission ratios in the pure mechanical transmission mode is implemented through combination of the other clutches and brakes; when the split brake is engaged while the hydraulic transmission input clutch and the hydraulic transmission output clutch are disengaged, no power is input into the hydraulic transmission assembly, and power is transmitted through the input shaft, the split mechanism ring gear, and the split mechanism planet carrier to the mechanical transmission assembly, and is then output from the output shaft after speed ratio adjustment at the mechanical transmission assembly;

in hydro-mechanical hybrid transmission, the hydraulic transmission input clutch and the hydraulic transmission output clutch are engaged, the split brake, the third clutch, the first one-way clutch, and the second one-way clutch are disengaged, and shift between gears of different transmission ratios in the hydro-mechanical hybrid transmission mode is implemented through combination of the other clutches and brakes; power passes through the input shaft and the split mechanism ring gear to the split mechanism planet carrier, and is split at the split mechanism planet carrier into the mechanical transmission assembly and the split mechanism sun gear respectively; since the split mechanism sun gear is connected to the hydraulic transmission assembly, the power is finally converged and output from the output shaft.

The pure mechanical transmission mode includes mechanical transmission gear-I, mechanical transmission gear-II, mechanical transmission gear-III, and mechanical transmission gear-IV, specifically implemented as follows:

in mechanical transmission gear-I, the first brake, the first clutch, and the second clutch are disengaged, while the third clutch, the first one-way clutch, and the second one-way clutch are engaged; power from the split mechanism planet carrier sequentially passes through the third clutch, the first one-way clutch, the front planetary-gear-set sun gear, and the front planetary-gear-set planet carrier to the output shaft;

in mechanical transmission gear-II, the first brake, the first clutch, the second clutch, and the second one-way clutch are disengaged, while the third clutch and the first one-way clutch are engaged; power from the split mechanism planet carrier sequentially passes through the third clutch, the first one-way clutch, and the front planetary-gear-set sun gear to the front planetary-gear-set planet carrier, and is split at the front planetary-gear-set planet carrier into the output shaft and the front planetary-gear-set ring gear respectively; the power in the front planetary-gear-set ring gear is sequentially transmitted to the rear planetary-gear-set planet carrier and the rear planetary-gear-set ring gear and is finally converged to the output shaft;

in mechanical transmission gear-III, the first brake, the second clutch, and the second one-way clutch are disengaged, while the first clutch, the third clutch, and the first one-way clutch are engaged; power is input from the split mechanism planet carrier to the first clutch, then split into the front planetary-gear-set ring gear and the front planetary-gear-set sun gear respectively, and converged at the front planetary-gear-set planet carrier and finally output from the output shaft;

in mechanical transmission gear-IV, the second clutch, the third clutch, the first one-way clutch, and the second one-way clutch are disengaged, while the first clutch and the first brake are engaged; power from the split mechanism planet carrier sequentially passes through the first clutch, the front planetary-gear-set ring gear, the rear planetary-gear-set planet carrier, and the rear planetary-gear-set ring gear and is output from the output shaft.

The hydro-mechanical hybrid transmission mode includes hybrid transmission gear-I, hybrid transmission gear-II, hybrid transmission gear-III, and hybrid transmission gear-IV, specifically implemented as follows:

in hybrid transmission gear-I, the first brake, the first clutch, and the fourth clutch are disengaged, while the second brake and the second clutch are engaged; power passes through the split mechanism ring gear and is split at the split mechanism planet carrier, a part of the power from the split mechanism planet carrier passes through the split mechanism sun gear to the hydraulic transmission assembly, the other part of the power from the split mechanism planet carrier sequentially passes through the second clutch, the front planetary-gear-set sun gear, and the front planetary-gear-set planet carrier, and the power is finally converged and output from the output shaft;

in hybrid transmission gear-II, the second brake, the first clutch, and the fourth clutch are disengaged, while the first brake and the second clutch are engaged; power passes through the split mechanism ring gear and is split at the split mechanism planet carrier, a part of the power from the split mechanism planet carrier passes through the split mechanism sun gear to the hydraulic transmission assembly, the other part of the power from the split mechanism planet carrier sequentially passes through the second clutch and the front planetary-gear-set sun gear to the front planetary-gear-set planet carrier, the power at the front planetary-gear-set planet carrier is split into the output shaft and the front planetary-gear-set ring gear respectively, the power at the front planetary-gear-set ring gear is sequentially transmitted to the rear planetary-gear-set planet carrier and the rear planetary-gear-set ring gear, and the split three parts of the power are finally converged to the output shaft;

in hybrid transmission gear-III, the first brake, the second brake, and the fourth clutch are disengaged, while the first clutch and the second clutch are engaged; power passes through the split mechanism ring gear and is split at the split mechanism planet carrier, a part of the power from the split mechanism planet carrier passes through the split mechanism sun gear to the hydraulic transmission assembly, the other part of the power is input from the split mechanism planet carrier to the second clutch, then split into the front planetary-gear-set ring gear and the front planetary-gear-set sun gear respectively, and converged at the front planetarygear-set planet carrier, and the power in the mechanical transmission assembly and the power in the hydraulic transmission assembly are converged and output from the output shaft;

in hybrid transmission gear-IV, the first brake, the first clutch, and the second clutch are disengaged, while the second brake and the fourth clutch are engaged; power passes through the split mechanism ring gear and is split at the split mechanism planet carrier, a part of the power from the split mechanism planet carrier passes through the split mechanism sun gear to the hydraulic transmission assembly, the other part of the power from the split mechanism planet carrier sequentially passes through the fourth clutch, the rear planetary-gear-set sun gear, and the rear planetary-gear-set ring gear to the output shaft, and the power in the mechanical transmission assembly and the power in the hydraulic transmission assembly are converged and output from the output shaft.

transmission gear-III involves two gear-shift components, the shift from hybrid transmission gear-III to hybrid transmission gear-IV involves four gear-shift components, the shift from hybrid transmission gear-I to hybrid transmission gear-III involves two gear-shift components, the shift from hybrid transmission gear-I to hybrid transmission gear-IV involves two gear-shift components, and the shift from hybrid transmission gear-II to hybrid transmission gear-IV involves four gear-shift components;

as for gear shift involving two or less gear-shift components, an optimization solution is derived from not more than three tests; as for gear shift involving three or four gear-shift components with no interaction, an orthogonal array is used for analysis; as for gear shift involving four gear-shift components, four columns of the orthogonal array are made full use of; as for gear shift involving three gear-shift components, any three columns of the orthogonal array are selected;

TABLE 1

Relationships between transmission gears and gear-shift components

| Gear | $B_1$ | $B_2$ | $B_3$ | $C_1$ | $C_2$ | $C_3$ | $C_4$ | $C_5$ | $C_6$ | $F_1$ | $F_2$ | Input-output relationship |
|---|---|---|---|---|---|---|---|---|---|---|---|---|
| Pure hydraulic transmission | ▲ | | | ▲ | ▲ | ▲ | | | | | | $n_0 = 2en_I$ |
| Hybrid transmission gear-I | | ▲ | | ▲ | ▲ | | | ▲ | | | | $n_0 = \dfrac{2n_I}{8.67 + \dfrac{1}{e}}$ |
| Hybrid transmission gear-II | | | ▲ | ▲ | ▲ | | | ▲ | | | | $n_0 = \dfrac{2n_I}{4.71 + \dfrac{1}{e}}$ |
| Hybrid transmission gear-III | | | | ▲ | ▲ | | ▲ | ▲ | | | | $n_0 = \dfrac{2n_I}{3.00 + \dfrac{1}{e}}$ |
| Hybrid transmission gear-IV | | | ▲ | ▲ | ▲ | ▲ | | | | | | $n_0 = \dfrac{2n_I}{-6.93 + \dfrac{1}{e}}$ |
| Mechanical transmission gear-I | ▲ | | | | | | ▲ | ▲ | ▲ | | | $n_0 = \dfrac{kn_I}{2.89(k+1)}$ |
| Mechanical transmission gear-II | ▲ | | | | | | | ▲ | ▲ | | | $n_0 = \dfrac{kn_I}{1.57(k+1)}$ |
| Mechanical transmission gear-III | ▲ | | | | | | ▲ | | ▲ | ▲ | | $n_0 = \dfrac{kn_I}{1.00(k+1)}$ |
| Mechanical transmission gear-IV | ▲ | ▲ | | | | | | ▲ | | | | $n_0 = \dfrac{kn_I}{0.69(k+1)}$ |

Note:
▲ stands for engagement state of a component;

Note: $B_1$ is split brake, $B_2$ is first brake, $B_3$ is second brake, $C_1$ is hydraulic transmission input clutch, $C_2$ is hydraulic transmission output clutch, $C_3$ is fourth clutch, $C_4$ is first clutch, $C_5$ is second clutch, $C_6$ is third clutch, $F_1$ is first one-way clutch, and $F_2$ is second one-way clutch.

During gear shift in the hydro-mechanical hybrid transmission mode, the shift from hybrid transmission gear-I to hybrid transmission gear-II involves two gear-shift components, the shift from hybrid transmission gear-II to hybrid the variation, change rate, and quadratic differential and time of the angular velocity of the output shaft are determined as evaluation indexes, "advance", "on-time", and "delay" shifts are selected as three levels, and orthogonal analysis with interaction is performed; test data is acquired through tests; the sum of squares of deviations and the degree of freedom of each factor and error are determined according to an analysis of variance table and are compared with a critical value, to determine the significance of each factor and error; a preferred solution of each evaluation index is obtained, and an optimization solution is determined according to a weighting coefficient; and shift timing data of the gear-shift mechanism obtained in different working conditions are grouped and used for controlling the shift timing of each group of the gear-shift components.

The control method of gear shift in the hydro-mechanical hybrid transmission mode specifically includes the following steps:

1) selecting the variation α, change rate β, and quadratic differential γ and shift time t of the angular velocity of the output shaft as evaluation indexes, wherein α, β, and γ are respectively zero-order, first-order, and second-order differentials of the rotation speed and are together with the time t to form spatio-temporal evaluation indexes;

the variation of the angular velocity of the output shaft is defined as:

$$\alpha = |\overline{\omega}_0 - \omega_{0min}|$$

wherein α is variation of the angular velocity of the output shaft, $\overline{\omega}_0$ is steady-state angular velocity of the output shaft, and $\omega_{0\ min}$ is minimum angular velocity of the output shaft;

the change rate of the angular velocity of the output shaft is defined as:

$$\beta = \frac{d\omega}{dt}$$

wherein β is change rate of the angular velocity of the output shaft;

the torque of the output shaft is:

$$T_0 = \beta \cdot J_0$$

wherein $T_0$ is torque of the output shaft, and $J_0$ is rotational inertia of the output shaft;

the quadratic differential of the angular velocity of the output shaft is defined as:

$$\gamma = \frac{d\beta}{dt} = \frac{d^2\omega}{dt^2}$$

wherein γ is quadratic differential of the angular velocity of the output shaft;

jerk is the change rate of the longitudinal acceleration of a vehicle:

$$j = \frac{r_d}{i_g i_0} \gamma$$

wherein j is jerk, $r_d$ is tire power radius, $i_g$ is gear ratio, and $i_0$ is drive axle ratio;

2) establishing an $L_9(3^4)$ orthogonal array as shown in Table 2, wherein "1", "2", and "3" are three levels, respectively representing "advance", "on-time", and "delay" shifts of related gear-shift components; "a", "b", "c", and "d" are four factors, respectively representing gear-shift components with no interaction; n is the total number of tests, n=9, and $K_i^F$ is the sum of test results related to the $i^{th}$ level of the factor (i∈(1, 2, 3), F∈(a, b, c, d));

TABLE 2

Orthogonal array of component shift timing in the hydro-mechanical hybrid transmission mode

| | a<br>1 | b<br>2 | c<br>3 | d<br>4 | Test result<br>$x_i$ |
|---|---|---|---|---|---|
| 1 | 1 | 1 | 1 | 1 | |
| 2 | 1 | 2 | 2 | 2 | |
| 3 | 1 | 3 | 3 | 3 | |
| 4 | 2 | 1 | 2 | 3 | |
| 5 | 2 | 2 | 3 | 1 | |
| 6 | 2 | 3 | 1 | 2 | |
| 7 | 3 | 1 | 3 | 2 | |
| 8 | 3 | 2 | 1 | 3 | |
| 9 | 3 | 3 | 2 | 1 | | the expression of the symbols in Table 2 is as follows:

$$k_i^F = \frac{K_i^F}{3}$$

the range is:

$$R^F = \max\left\{|k_i^F - k_j^F|\right\}$$

the order of priority of the factors is determined through the range data, the preferred solution of each evaluation index is determined, and finally the optimal solution is determined according to the weighting coefficient;

the optimal solution is determined by:

$$\begin{cases} \xi = \sum_{k=1}^{N} \lambda_k \xi_k \\ \xi_k \in [\xi_{kmin}, \xi_{kmax}] \end{cases}$$

wherein ξ is a comprehensive evaluation index, $\xi_k$ is a single evaluation index, $\xi_{kmin}/\xi_{kmax}$ is upper/lower limit of a single evaluation index, and $\lambda_k$ is a weighting coefficient;

3) designing an orthogonal array header, specifying a test scheme, and conducting 9 tests to obtain test results;

4) calculating the range according to the test results, determining the order of priority of the factors, obtaining the preferred solution of each evaluation index $\xi_k$, and determining the optimization solution according to the weighting coefficient $\lambda_k$;

wherein the optimization solution of the hydro-mechanical hybrid gear is determined by the following formulas:

$$\begin{cases} \xi = \sum_{k=1}^{N} \lambda_k \xi_k \\ \xi_k \in [\xi_{kmin}, \xi_{kmax}] \end{cases}$$

wherein ξ is a comprehensive evaluation index, $\xi^k$ is a single evaluation index, $\xi_{kmin}/\xi_{kmax}$ is upper/lower limit of a single evaluation index, and $\lambda_k$ is a weighting coefficient;

5) if the optimization solution does not meet the requirement, increasing or reducing the "advance" time and "delay" time, or selecting different "advance" time and "delay" time, till the optimization solution meets the requirement.

During gear shift in the pure mechanical transmission mode, the shift from mechanical gear-I to mechanical gear-II involves one gear-shift component, the shift from mechanical gear-II to mechanical gear-III involves one gear-shift component, the shift from mechanical gear-III to mechanical gear-IV involves three gear-shift components, the shift from mechanical gear-I to mechanical gear-III involves two gear-shift components, the shift from mechanical gear-I to mechanical gear-IV involves five gear-shift components, and the shift from mechanical gear-II to mechanical gear-IV involves four gear-shift components;

as for gear shift involving two or less gear-shift components, an optimization solution is derived from not more than three tests; as for gear shift involving three gear-shift components, two of which have interaction, gear shift involving five gear-shift components, three of which have interaction, and gear shift involving four gear-shift components, two of which have interaction, an orthogonal array is used for analysis, and a corresponding list is selected during the analysis;

the variation, change rate, and quadratic differential and time of the angular velocity of the output shaft are determined as evaluation indexes, "advance", "on-time", and "delay" shifts are selected as three levels, and orthogonal analysis with no interaction is performed; test data is acquired through tests; the range is calculated according to the test data, the order of priority of the factors is determined, and the preferred solution of each evaluation index is obtained; the optimization solution is determined according to the weighting coefficient; and gear shift is controlled by paired matrixing programs formed by the optimization solutions in different working conditions.

The control method of gear shift in the pure mechanical transmission mode specifically includes the following steps:

1) selecting the variation a, change rate $\beta$, and quadratic differential $\gamma$ and time t of the angular velocity of the output shaft as evaluation indexes, wherein $\alpha$, $\beta$, and $\gamma$ are respectively zero-order, first-order, and second-order differentials of the rotation speed and are together with the time t to form spatio-temporal evaluation indexes;

the variation of the angular velocity of the output shaft is defined as:

$$\alpha = |\overline{\omega}_0 - \omega_{0\,min}|$$

wherein $\alpha$ is variation of the angular velocity of the output shaft, $\overline{\omega}_0$ is steady-state angular velocity of the output shaft, and $\omega_{0\,min}$ is minimum angular velocity of the output shaft;

the change rate of the angular velocity of the output shaft is defined as:

$$\beta = \frac{d\omega}{dt}$$

wherein $\beta$ is change rate of the angular velocity of the output shaft;

the torque of the output shaft is determined by the formula:

$$T_0 = \beta \cdot J_0$$

wherein $T_0$ is torque of the output shaft, and $J_0$ is rotational inertia of the output shaft;

the quadratic differential of the angular velocity of the output shaft is defined as:

$$\gamma = \frac{d\beta}{dt} = \frac{d^2\omega}{dt^2}$$

wherein $\gamma$ is quadratic differential of the angular velocity of the output shaft;

jerk is the change rate of the longitudinal acceleration of a vehicle and is determined by the formula:

$$j = \frac{r_d}{i_g i_0} \gamma$$

wherein j is jerk, $r_d$ is tire power radius, $i_g$ is gear ratio, and $i_0$ is drive axle ratio;

2) establishing an $L_{27}(3^{13})$ orthogonal array as shown in Table 3, wherein "1", "2", and "3" respectively represent "advance", "on-time", and "delay" shifts of related gear-shift components; "a" and "b" respectively represent gear-shift components with no interaction; "c", "d", and "e" respectively represent gear-shift components with interaction;

n is the total number of tests, n=27 and $K_i^F$ is the sum of test results related to the $i^{th}$ level of the factor (i$\in$(1,2,3), F$\in$(e, c, exc1, exc2, d, exd1, exd2, cxd1, a, b, cxd2));

TABLE 3

Orthogonal array of component shift timing in the mechanical transmission mode

| | Test factor | | | | | | | | | | | | |
|---|---|---|---|---|---|---|---|---|---|---|---|---|---|
| No. | e<br>1 | c<br>2 | e × c$_1$<br>3 | e × c$_2$<br>4 | d<br>5 | e × d$_1$<br>6 | e × d$_2$<br>7 | c × d$_1$<br>8 | a<br>9 | b<br>10 | c × d$_2$<br>11 | Test<br>result<br>x$_i$ | x$_i^2$ |
| 1 | 1 | 1 | 1 | 1 | 1 | 1 | 1 | 1 | 1 | 1 | 1 | | |
| 2 | 1 | 1 | 1 | 1 | 2 | 2 | 2 | 2 | 2 | 2 | 2 | | |
| 3 | 1 | 1 | 1 | 1 | 3 | 3 | 3 | 3 | 3 | 3 | 3 | | |
| 4 | 1 | 2 | 2 | 2 | 1 | 1 | 1 | 2 | 2 | 2 | 3 | | |
| 5 | 1 | 2 | 2 | 2 | 2 | 2 | 2 | 3 | 3 | 3 | 1 | | |
| 6 | 1 | 2 | 2 | 2 | 3 | 3 | 3 | 1 | 1 | 1 | 2 | | |
| 7 | 1 | 3 | 3 | 3 | 1 | 1 | 1 | 3 | 3 | 3 | 2 | | |
| 8 | 1 | 3 | 3 | 3 | 2 | 2 | 2 | 1 | 1 | 1 | 3 | | |
| 9 | 1 | 3 | 3 | 3 | 3 | 3 | 3 | 2 | 2 | 2 | 1 | | |
| 10 | 2 | 1 | 2 | 3 | 1 | 2 | 3 | 1 | 2 | 3 | 3 | | |
| 11 | 2 | 1 | 2 | 3 | 2 | 3 | 1 | 2 | 3 | 1 | 1 | | |
| 12 | 2 | 1 | 2 | 3 | 3 | 1 | 2 | 3 | 1 | 2 | 2 | | |
| 13 | 2 | 2 | 3 | 1 | 1 | 2 | 3 | 2 | 3 | 1 | 2 | | |
| 14 | 2 | 2 | 3 | 1 | 2 | 3 | 1 | 3 | 1 | 2 | 3 | | |
| 15 | 2 | 2 | 3 | 1 | 3 | 1 | 2 | 1 | 2 | 3 | 1 | | |

TABLE 3-continued

Orthogonal array of component shift timing
in the mechanical transmission mode

| | Test factor | | | | | | | | | | | Test result | |
|---|---|---|---|---|---|---|---|---|---|---|---|---|---|
| No. | e 1 | c 2 | e × c$_1$ 3 | e × c$_2$ 4 | d 5 | e × d$_1$ 6 | e × d$_2$ 7 | c × d$_1$ 8 | a 9 | b 10 | c × d$_2$ 11 | $x_i$ | $x_i^2$ |
| 16 | 2 | 3 | 1 | 2 | 1 | 2 | 3 | 3 | 1 | 2 | 1 | | |
| 17 | 2 | 3 | 1 | 2 | 2 | 3 | 1 | 1 | 2 | 3 | 2 | | |
| 18 | 2 | 3 | 1 | 2 | 3 | 1 | 2 | 2 | 3 | 1 | 3 | | |
| 19 | 3 | 1 | 3 | 2 | 1 | 3 | 2 | 1 | 3 | 2 | 2 | | |
| 20 | 3 | 1 | 3 | 2 | 2 | 1 | 3 | 2 | 1 | 3 | 3 | | |
| 21 | 3 | 1 | 3 | 2 | 3 | 2 | 1 | 3 | 2 | 1 | 1 | | |
| 22 | 3 | 2 | 1 | 3 | 1 | 3 | 2 | 2 | 3 | 3 | 1 | | |
| 23 | 3 | 2 | 1 | 3 | 2 | 1 | 3 | 3 | 1 | 1 | 2 | | |
| 24 | 3 | 2 | 1 | 3 | 3 | 2 | 1 | 1 | 2 | 2 | 3 | | |
| 25 | 3 | 3 | 2 | 1 | 1 | 3 | 2 | 3 | 3 | 1 | 3 | | |
| 26 | 3 | 3 | 2 | 1 | 2 | 1 | 3 | 1 | 2 | 2 | 1 | | |
| 27 | 3 | 3 | 2 | 1 | 3 | 2 | 1 | 2 | 1 | 3 | 2 | | |
| $K_1$ | $K_1^e$ | $K_1^c$ | $K_1^{e \times c1}$ | $K_1^{e \times c2}$ | $K_1^d$ | $K_1^{e \times d1}$ | $K_1^{e \times d2}$ | $K_1^{c \times d1}$ | $K_1^a$ | $K_1^b$ | $K_1^{c \times d2}$ | K | W |
| $K_2$ | $K_2^e$ | $K_2^c$ | $K_2^{e \times c1}$ | $K_2^{e \times c2}$ | $K_2^d$ | $K_2^{e \times d1}$ | $K_2^{e \times d2}$ | $K_2^{c \times d1}$ | $K_2^a$ | $K_2^b$ | $K_2^{c \times d2}$ | | |
| $K_3$ | $K_3^e$ | $K_3^c$ | $K_3^{e \times c1}$ | $K_3^{e \times c2}$ | $K_3^d$ | $K_3^{e \times d1}$ | $K_3^{e \times d2}$ | $K_3^{c \times d1}$ | $K_3^a$ | $K_3^b$ | $K_3^{c \times d2}$ | | |
| U | $U_e$ | $U_c$ | $U_{e \times c1}$ | $U_{e \times c2}$ | $U_d$ | $U_{e \times d1}$ | $U_{e \times d2}$ | $U_{c \times d1}$ | $U_a$ | $U_b$ | $U_{c \times d2}$ | P | |
| Q | $Q_e$ | $Q_c$ | $Q_{e \times c1}$ | $Q_{e \times c2}$ | $Q_d$ | $Q_{e \times d1}$ | $Q_{e \times d2}$ | $Q_{c \times d1}$ | $Q_a$ | $Q_b$ | $Q_{c \times d2}$ | | | the expressions of the symbols in Table 3 are as follows:

$$K = K_1 + K_2 + K_3 = \sum_{i=1}^{27} x_i$$

$$W = \sum_{i=1}^{27} x_i^2$$

$$P = \frac{K^2}{27}$$

$$U_F = \frac{\sum_{i=1}^{3} (K_i^F)^2}{3}$$

3) designing an orthogonal array header as shown in Table 4, specifying a test scheme and conducting 27 tests to obtain test results $x_1$ (i=1 ..., 27), and calculating related statistical values;

4) determining the sum of squares of deviations, the degree of freedom, and the F value of each factor and error according to an analysis of variance table, and comparing with a critical value to determine the significance of each factor and error;

TABLE 4

Analysis of variance table of component shift timing in the mechanical transmission mode

| Source | Sum of squares of deviations | Degree of freedom | Mean sum of squares of deviations | F value | Critical value | Significance value | Optimal solution |
|---|---|---|---|---|---|---|---|
| E | $Q_E$ | 2 | $\frac{Q_E}{2}$ | $\frac{2Q_E}{Q_e}$ | $F_a(2,4)$ | | Judge the significance of the factor E |
| C | $Q_C$ | 2 | $\frac{Q_C}{2}$ | $\frac{2Q_C}{Q_e}$ | $F_a(2,4)$ | | Judge the significance of the factor C |
| E × C | $Q_{E \times C1} + Q_{E \times C2}$ ($Q_{E \times C}$) | 4 | $\frac{Q_{E \times C}}{4}$ | $\frac{Q_{E \times C}}{Q_e}$ | $F_a(4,4)$ | | Judge that the interaction is significant |
| D | $Q_D$ | 2 | $\frac{Q_{E \times C}}{Q_e}$ | $\frac{2Q_D}{Q_e}$ | $F_a(2,4)$ | | Judge the significance of the factor D |
| E × D | $Q_{E \times D1} + Q_{E \times D2}$ ($Q_{E \times D}$) | 4 | $\frac{Q_{E \times D}}{4}$ | $\frac{Q_{E \times D}}{Q_e}$ | $F_a(4,4)$ | | Judge that the interaction is significant |

TABLE 4-continued

Analysis of variance table of component shift timing in the mechanical transmission mode

| Source | Sum of squares of deviations | Degree of freedom | Mean sum of squares of deviations | F value | Critical value | Significance value | Optimal solution |
|---|---|---|---|---|---|---|---|
| C × D | $Q_{C\times D1} + Q_{C\times D2}$ $(Q_{C\times D})$ | 4 | $\dfrac{Q_{C\times D}}{4}$ | $\dfrac{Q_{C\times D}}{Q_e}$ | $F_a(4,4)$ | | Judge that the interaction is significant |
| A | $Q_A$ | 2 | $\dfrac{Q_A}{2}$ | $\dfrac{2Q_A}{Q_e}$ | $F_a(2,4)$ | | Judge the significance of the factor A |
| B | $Q_B$ | 2 | $\dfrac{Q_B}{2}$ | $\dfrac{2Q_B}{Q_e}$ | $F_a(2,4)$ | | Judge the significance of the factor B |
| e* | $Q_e$ | 4 | $\dfrac{Q_e}{4}$ | | $F_a(4,4)$ | | | wherein the total sum of squares of deviations $Q_T$, the sum of squares of deviations of each factor $Q_F$, and the sum of squares of deviations of each error $Q_e$ are respectively:

$$Q_T = W - P = \Sigma Q_F + Q_e$$

$$Q_F = U_F - P$$

the total degree of freedom $f_T=26$, the degree of freedom of each factor $f_F=2$, and the degree of freedom of each error $f_e=4$;

the mean sums of squares of deviations of the factors and errors are:

$$S_F^2 = \frac{Q_F}{f_F}$$

$$S_e^2 = \frac{Q_e}{f_e}$$

the F value is:

$$F_F = \frac{S_F^2}{S_e^2}$$

the analysis of variance table of component shift timing in the mechanical transmission mode is shown in Table 1:

the sources of variance mainly lie in three parts: (1) "a", "b", "c", "d", and "e"; (2) "e×c" (including e×c1 and e×c2), "e×d" (including e×d1 and e×d2), and "c×d" (including c×d1 and c×d2); (3) errors e*;

the $F_F$ value is compared with the $F_\alpha(f_F, f_e)$ according to the calculated sum of squares of deviations, degree of freedom, and mean sum of squares of deviations of each factor and error in the sources of variance;

if $F_F > F_\alpha(f_F, f_e)$, the influence of the factor is significant and vice versa; the factors of significant influence are selected, and the importance and the order of priority of each factor are intuitively analyzed to determine an optimal gear-shift solution;

the optimization solution of the mechanical gear is determined by the following formulas:

$$\begin{cases} \zeta = \sum_{k=1}^{N} \mu_k \zeta_k \\ \zeta_k \in [\zeta_{kmin}, \zeta_{kmax}] \end{cases}$$

wherein $\zeta$ is a comprehensive evaluation index, $\zeta_k$ is a single evaluation index, $\zeta_{kmin}/\zeta_{kmax}$ is upper/lower limit of a single evaluation index, and $\mu_k$ is a weighting coefficient.

Beneficial effects: 1. The present invention can switch between hydraulic transmission, hydro-mechanical hybrid transmission, and mechanical transmission, wherein multiple gears are available for selection in each transmission mode, and can provide multiple power distribution modes according to complex working conditions and make full use of transmission performance of mechanical transmission and stepless speed regulation performance of hydraulic transmission, thereby improving the working efficiency, power performance, and economy of vehicles. 2. By using the one-way clutches, the mechanical gear-shift device can not only enable engine braking, but also evenly use various gear-shift components to prolong the service life.

DETAILED DESCRIPTION OF THE EMBODIMENTS

The present invention is further described below with reference to the accompanying drawings.

Figure 1:
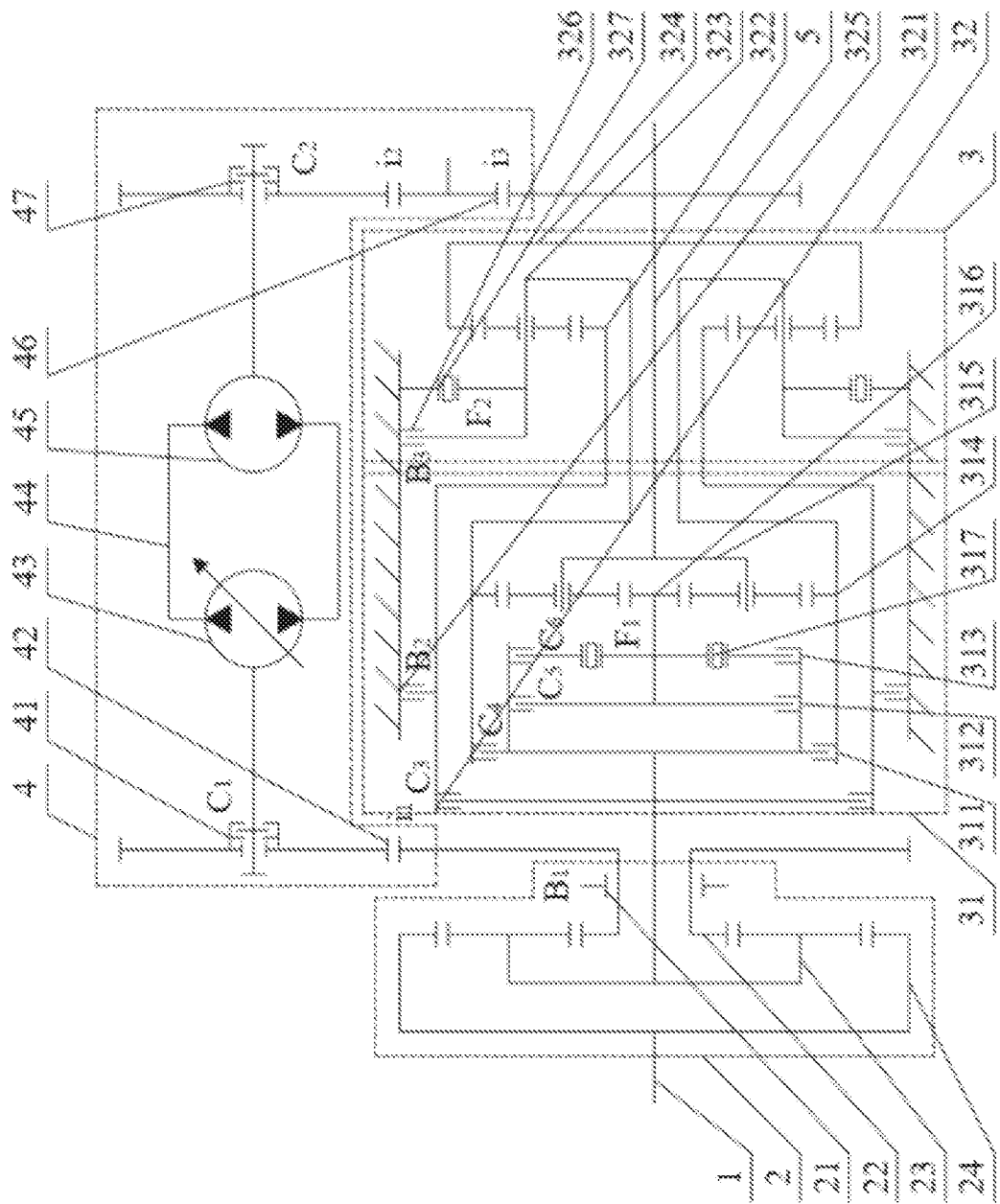
FIG. 1 is a schematic structural diagram of the present invention.

As shown in FIG. 1, a hydro-mechanical hybrid transmission device with multiple power distribution modes includes an input shaft 1, a split mechanism 2, a mechanical transmission assembly 3, a hydraulic transmission assembly 4, and an output shaft 5. The input shaft 1 is connected, through the split mechanism 2, to the mechanical transmission assembly 3 and the hydraulic transmission assembly 4 that are connected in parallel. The mechanical transmission assembly 3 and the hydraulic transmission assembly 4 are both connected to the output shaft 5. The mechanical transmission assembly 3 includes a front planetary-gear-set assembly 31 and a rear planetary-gear-set assembly 32 that are connected in series.

The front planetary-gear-set assembly 31 includes a first clutch 311, a second clutch 312, a third clutch 313, a front planetary-gear-set ring gear 314, a front planetary-gear-set planet carrier 315, a front planetary-gear-set sun gear 316, and a first one-way clutch 317. The first clutch 311 is arranged between the split mechanism 2 and the front planetary-gear-set ring gear 314. The second clutch 312 and the third clutch 313 are connected in parallel and are respectively connected to the front planetary-gear-set sun gear 316. The first one-way clutch 317 is arranged between the third clutch 313 and the front planetary-gear-set sun gear 316. The output shaft 5 is connected to the front planetary-gear-set planet carrier 315.

The rear planetary-gear-set assembly 32 includes a fourth clutch 321, a rear planetary-gear-set sun gear 322, a rear planetary-gear-set planet carrier 323, a rear planetary-gear-set ring gear 324, a first brake 325, a second brake 326, and a second one-way clutch 327. The fourth clutch 321 is arranged between the split mechanism 2 and the rear planetary-gear-set sun gear 322. The first brake 325 is connected to the rear planetary-gear-set sun gear 322. The rear planetary-gear-set planet carrier 323 is connected to the front planetary-gear-set ring gear 314 and is connected to the second brake 326 and the second one-way clutch 327 that are connected in parallel. The rear planetary-gear-set ring gear 324 is connected to the output shaft 5.

The hydraulic transmission assembly 4 includes a hydraulic transmission input clutch 41, a hydraulic transmission input gear pair 42, a hydraulic pump 43, a hydraulic oil pipe 44, a hydraulic motor 45, a hydraulic transmission output gear pair 46, and a hydraulic transmission output clutch 47. The hydraulic pump 43 is connected to the split mechanism 2 through the hydraulic transmission input gear pair 42. The hydraulic transmission input clutch 41 is arranged between the hydraulic transmission input gear pair 42 and the hydraulic pump 43. The hydraulic pump 43 is connected to the hydraulic motor 45 through the hydraulic oil pipe 44. The hydraulic motor 45 is connected to the output shaft 5 through the hydraulic transmission output gear pair 46. The hydraulic transmission output clutch 47 is arranged between the hydraulic motor 45 and the hydraulic transmission output gear pair 46.

The split mechanism 2 includes a split brake 21, a split mechanism sun gear 22, a split mechanism planet carrier 23, and a split mechanism ring gear 24. The input shaft 1 is connected to the split mechanism ring gear 24. The split mechanism sun gear 22 is connected to the hydraulic transmission assembly 4. The split brake 21 is arranged on the split mechanism sun gear 22. The split mechanism planet carrier 23 is connected to the mechanical transmission assembly 3.

As shown in Table 1, three types of transmission, namely, pure hydraulic transmission, hydro-mechanical hybrid transmission, and pure mechanical transmission are implemented through combination and engagement/disengagement of the brakes and the clutches, and the specific transmission types are as follows.

Figure 2:
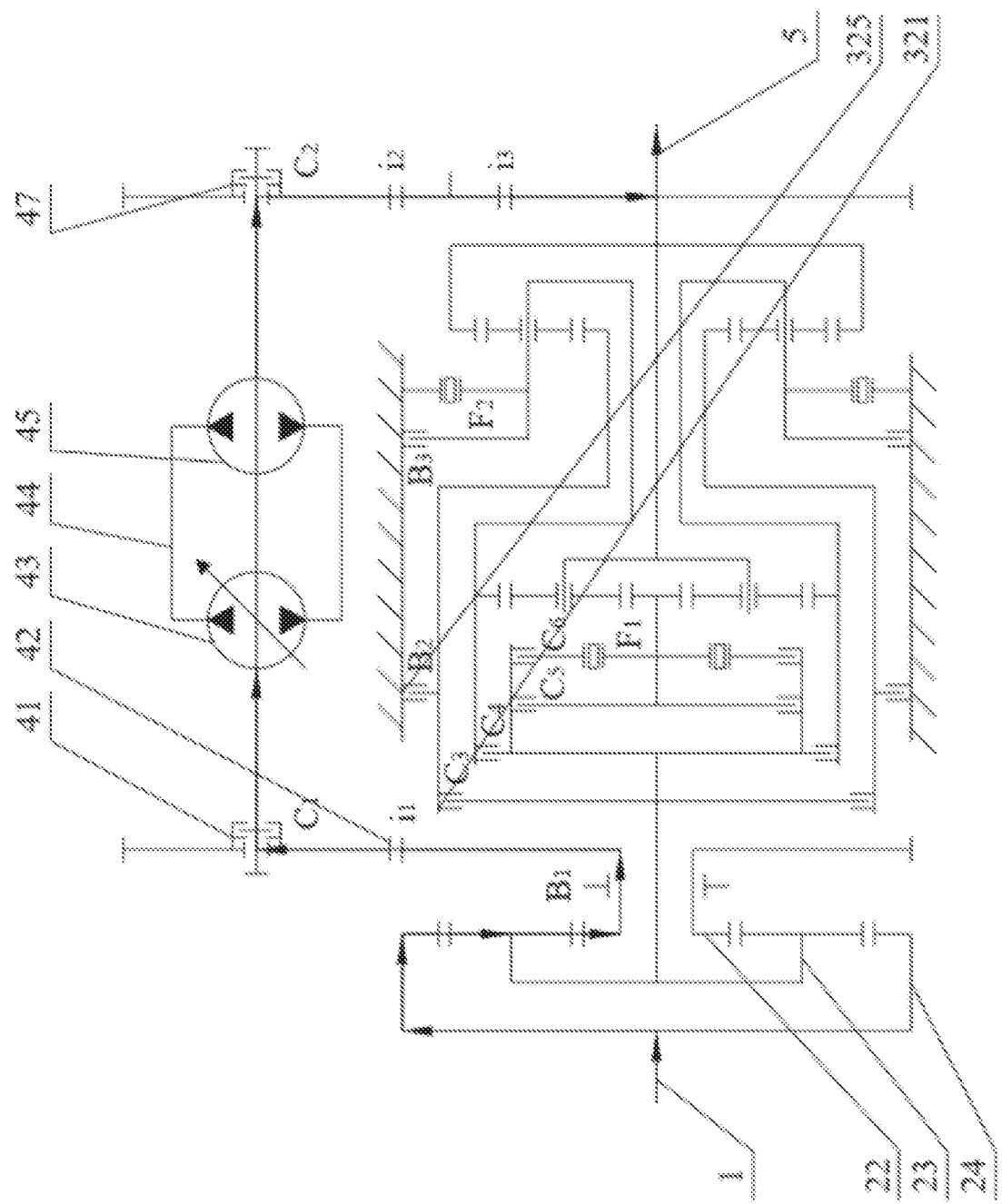
FIG. 2 is a schematic diagram showing the power flow in pure hydraulic transmission in the present invention.

As shown in FIG. 2, in pure hydraulic transmission, the first brake 325, the hydraulic transmission input clutch 41, the hydraulic transmission output clutch 47, and the fourth clutch 321 are engaged, while the other clutches and brakes are disengaged; when the fourth clutch 321 and the first brake 325 are engaged, the split mechanism planet carrier 23 is braked; and when the hydraulic transmission input clutch 41 and the hydraulic transmission output clutch 47 are engaged, power passes through the input shaft 1, the split mechanism ring gear 24, the split mechanism sun gear 22, the hydraulic transmission input gear pair 42, and the input clutch 41 to drive the hydraulic pump 43 to work, the hydraulic pump 43 converts mechanical power into high-pressure oil that passes through the hydraulic pipe 44 to drive the hydraulic motor 45 to work, and the mechanical power output by the hydraulic motor 45 is transmitted through the hydraulic transmission output clutch 47 and the hydraulic transmission output gear pair 46 to the output shaft 5.

As shown in FIG. 3, FIG. 4, FIG. 5, and FIG. 6, in pure mechanical transmission, the split brake 21 is engaged, the hydraulic transmission input clutch 41, the hydraulic transmission output clutch 47, the second brake 326, and the fourth clutch 321 are disengaged, and shift between gears of different transmission ratios in the pure mechanical transmission mode is implemented through combination of the other clutches and brakes; when the split brake 21 is engaged while the hydraulic transmission input clutch 41 and the hydraulic transmission output clutch 47 are disengaged, no power is input into the hydraulic transmission assembly 4, and power is transmitted through the input shaft 1, the split mechanism ring gear 24, and the split mechanism planet carrier 23 to the mechanical transmission assembly 3, and is then output from the output shaft 5 after speed ratio adjustment at the mechanical transmission assembly 3.

As shown in FIG. 7, FIG. 8, FIG. 9, and FIG. 10, in hydro-mechanical hybrid transmission, the hydraulic transmission input clutch 41 and the hydraulic transmission output clutch 47 are engaged, the split brake 21, the third clutch 313, the first one-way clutch 317, and the second one-way clutch 327 are disengaged, and shift between gears of different transmission ratios in the hydro-mechanical hybrid transmission mode is implemented through combination of the other clutches and brakes; power passes through the input shaft 1 and the split mechanism ring gear 24 to the split mechanism planet carrier 23, and is split at the split mechanism planet carrier 23 into the mechanical transmission assembly 3 and the split mechanism sun gear 22 respectively; since the split mechanism sun gear 22 is connected to the hydraulic transmission assembly 4, the power is finally converged and output from the output shaft 5.

The pure mechanical transmission mode includes mechanical transmission gear-I, mechanical transmission gear-II, mechanical transmission gear-III, and mechanical transmission gear-IV, specifically implemented as follows.

Figure 3:
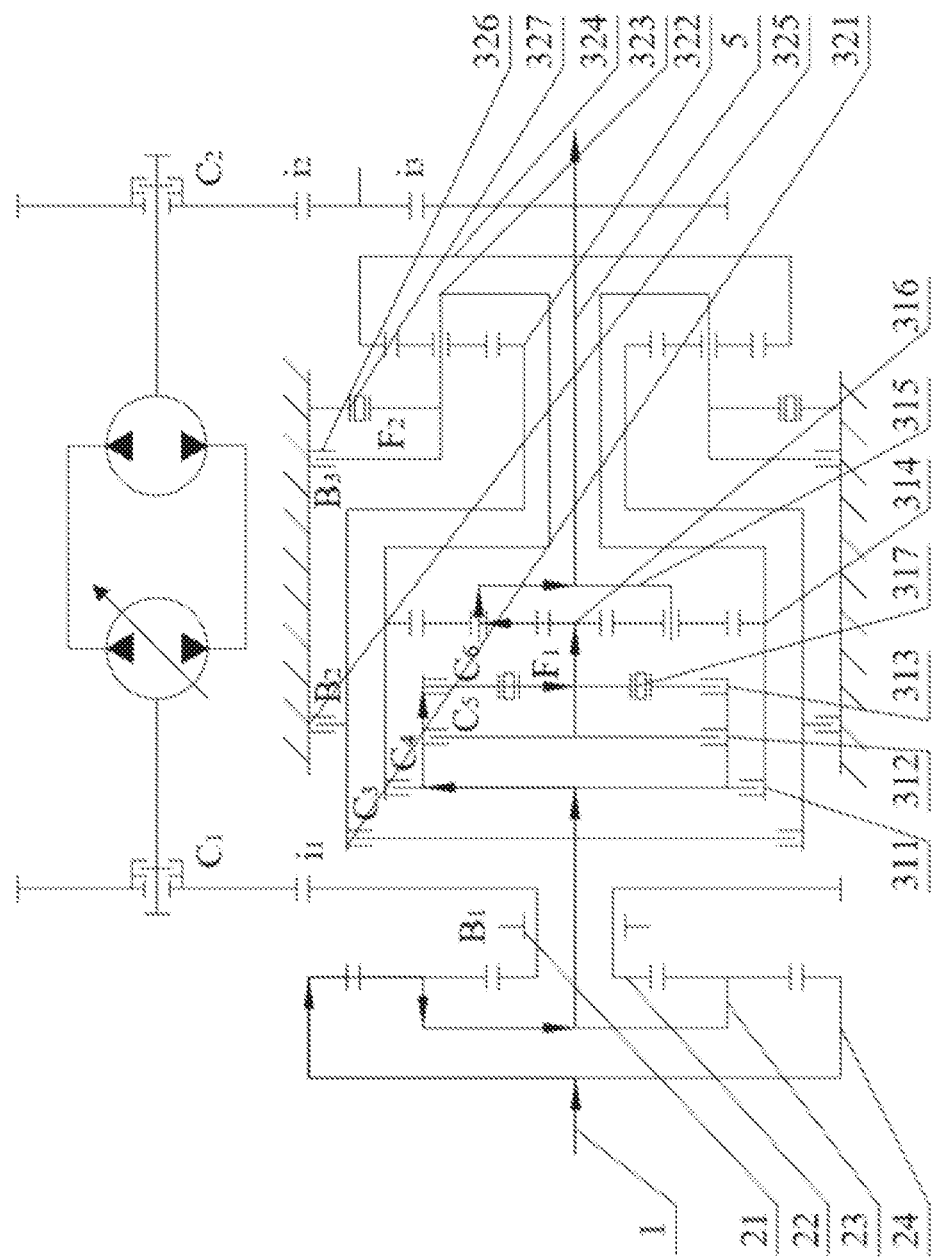
FIG. 3 is a schematic diagram showing the power flow in mechanical transmission gear-I in the present invention.

As shown in FIG. 3, in mechanical transmission gear-I, the first brake 325, the first clutch 311, and the second clutch 312 are disengaged, while the third clutch 313, the first one-way clutch 317, and the second one-way clutch 327 are engaged; power from the split mechanism planet carrier 23 sequentially passes through the third clutch 313, the first one-way clutch 317, the front planetary-gear-set sun gear 316, and the front planetary-gear-set planet carrier 315 to the output shaft 5.

Figure 4:
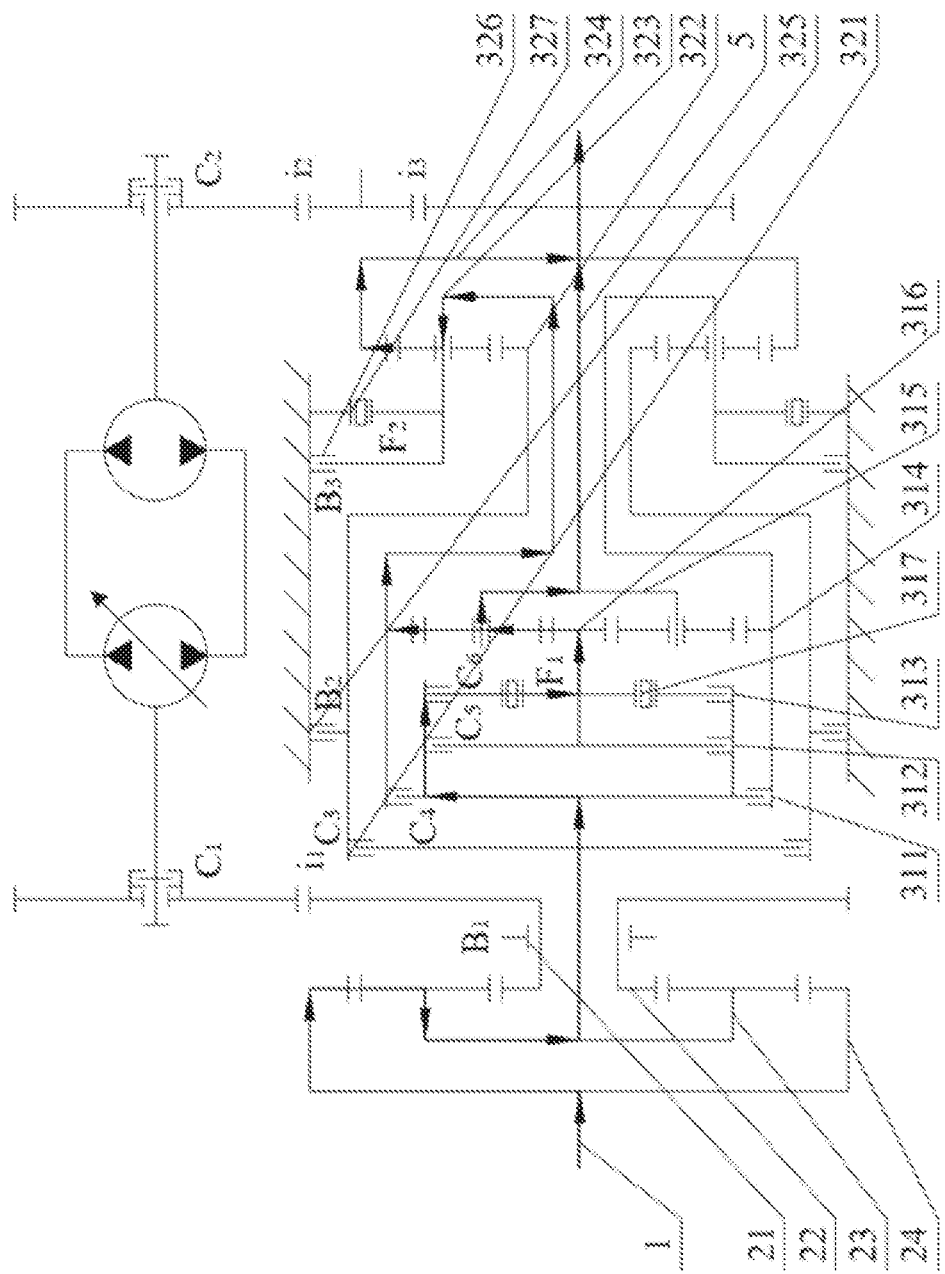
FIG. 4 is a schematic diagram showing the power flow in mechanical transmission gear-II in the present invention.

As shown in FIG. 4, in mechanical transmission gear-II, the first brake 325, the first clutch 311, the second clutch 312, and the second one-way clutch 327 are disengaged, while the third clutch 313 and the first one-way clutch 317 are engaged; power from the split mechanism planet carrier 23 sequentially passes through the third clutch 313, the first one-way clutch 317, and the front planetary-gear-set sun gear 316 to the front planetary-gear-set planet carrier 315, and is split at the front planetary-gear-set planet carrier 315 into the output shaft 5 and the front planetary-gear-set ring gear 314 respectively; the power in the front planetary-gear-set ring gear 314 is sequentially transmitted to the rear planetary-gear-set planet carrier 323 and the rear planetary-gear-set ring gear 324 and is finally converged to the output shaft 5.

Figure 5:
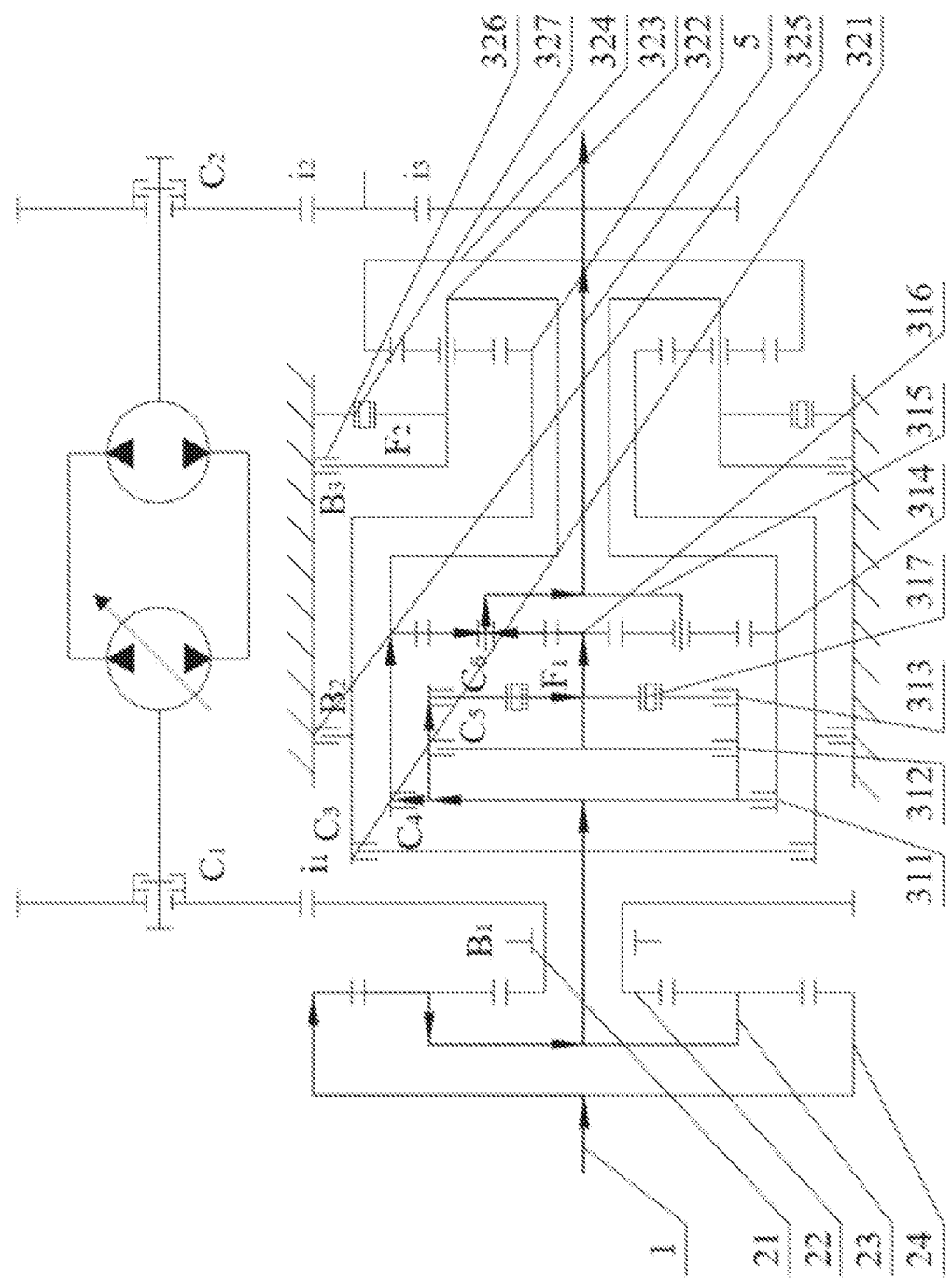
FIG. 5 is a schematic diagram showing the power flow in mechanical transmission gear-III in the present invention.

As shown in FIG. 5, in mechanical transmission gear-III, the first brake 325, the second clutch 312, and the second one-way clutch 327 are disengaged, while the first clutch 311, the third clutch 313, and the first one-way clutch 317 are engaged; power is input from the split mechanism planet carrier 23 to the first clutch 311, then split into the front planetary-gear-set ring gear 314 and the front planetary-gear-set sun gear 316 respectively, and converged at the front planetary-gear-set planet carrier 315 and finally output from the output shaft 5.

Figure 6:
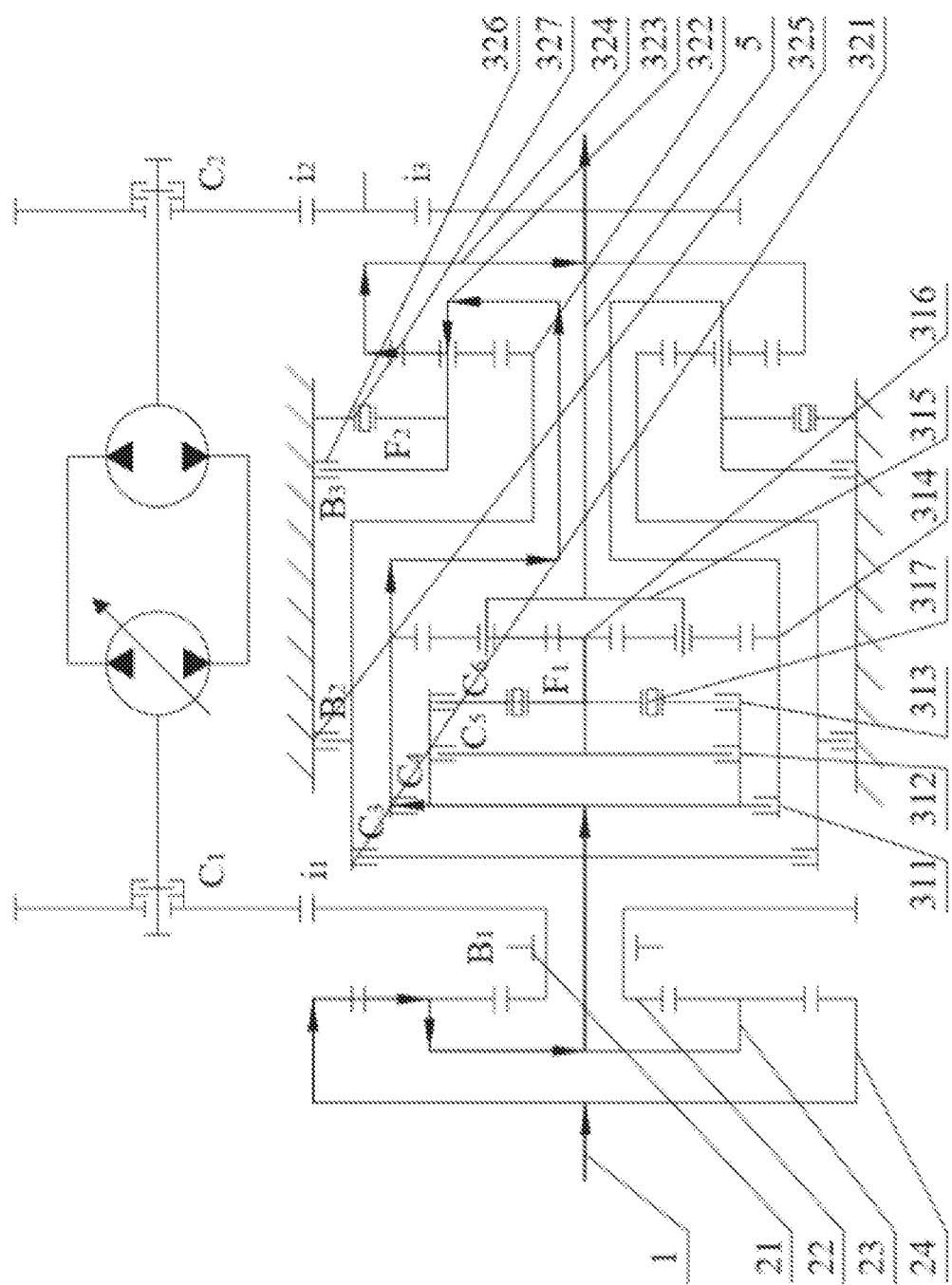
FIG. 6 is a schematic diagram showing the power flow in mechanical transmission gear-IV in the present invention.

As shown in FIG. 6, in mechanical transmission gear-W, the second clutch 312, the third clutch 313, the first one-way clutch 317, and the second one-way clutch 327 are disengaged, while the first clutch 311 and the first brake 325 are engaged; power from the split mechanism planet carrier 23 sequentially passes through the first clutch 311, the front planetary-gear-set ring gear 314, the rear planetary-gear-set planet carrier 323, and the rear planetary-gear-set ring gear 324 and is output from the output shaft 5.

The hydro-mechanical hybrid transmission mode includes hybrid transmission gear-I, hybrid transmission gear-II, hybrid transmission gear-III, and hybrid transmission gear-IV, specifically implemented as follows.

Figure 7:
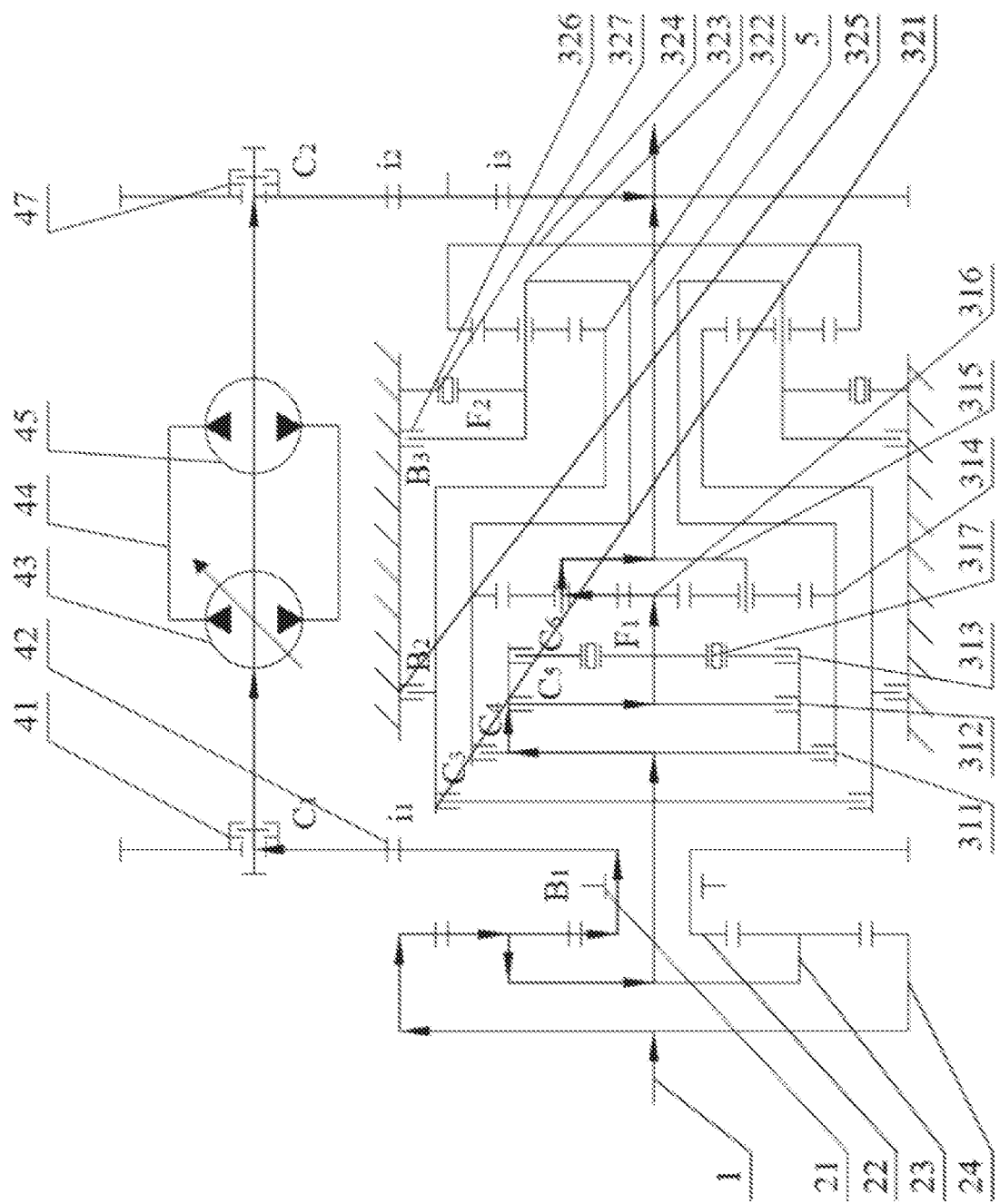
FIG. 7 is a schematic diagram showing the power flow in hybrid transmission gear-I in the present invention.

As shown in FIG. 7, in hybrid transmission gear-I, the first brake 325, the first clutch 311, and the fourth clutch 321 are disengaged, while the second brake 326 and the second clutch 312 are engaged; power passes through the split mechanism ring gear 24 and is split at the split mechanism planet carrier 23, a part of the power from the split mechanism planet carrier 23 passes through the split mechanism sun gear 22 to the hydraulic transmission assembly 4, the other part of the power from the split mechanism planet carrier 23 sequentially passes through the second clutch 312, the front planetary-gear-set sun gear 316, and the front planetary-gear-set planet carrier 315, and the power is finally converged and output from the output shaft 5.

Figure 8:
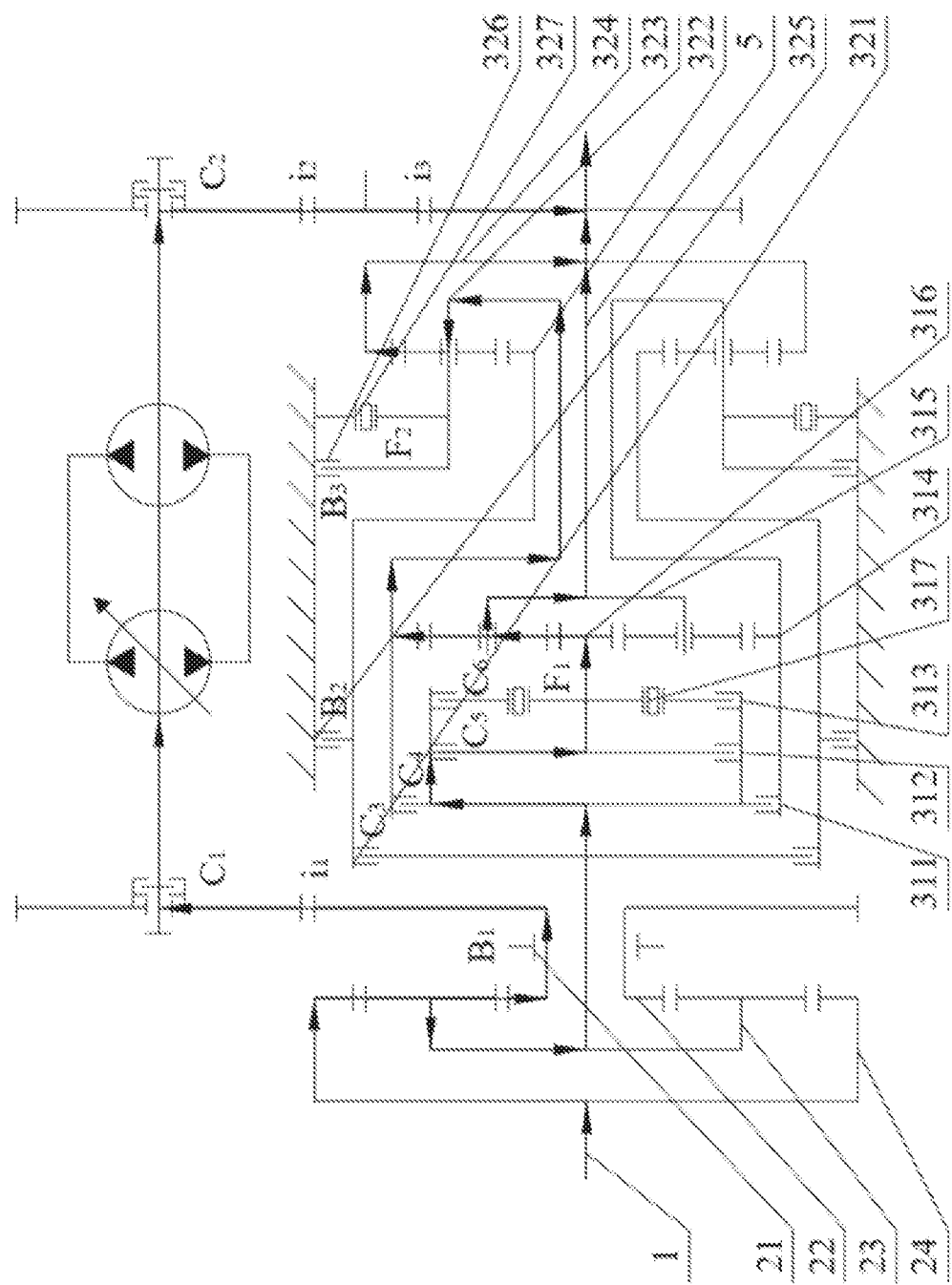
FIG. 8 is a schematic diagram showing the power flow in hybrid transmission gear-II in the present invention.

As shown in FIG. 8, in hybrid transmission gear-II, the second brake 326, the first clutch 311, and the fourth clutch 321 are disengaged, while the first brake 325 and the second clutch 312 are engaged; power passes through the split mechanism ring gear 24 and is split at the split mechanism planet carrier 23, a part of the power from the split mechanism planet carrier 23 passes through the split mechanism sun gear 22 to the hydraulic transmission assembly 4, the other part of the power from the split mechanism planet carrier 23 sequentially passes through the second clutch 312 and the front planetary-gear-set sun gear 316 to the front planetary-gear-set planet carrier 315, the power at the front planetary-gear-set planet carrier 315 is split into the output shaft 5 and the front planetary-gear-set ring gear 314 respectively, the power at the front planetary-gear-set ring gear 314 is sequentially transmitted to the rear planetary-gear-set planet carrier 323 and the rear planetary-gear-set ring gear 324, and the split three parts of the power are finally converged to the output shaft 5.

Figure 9:
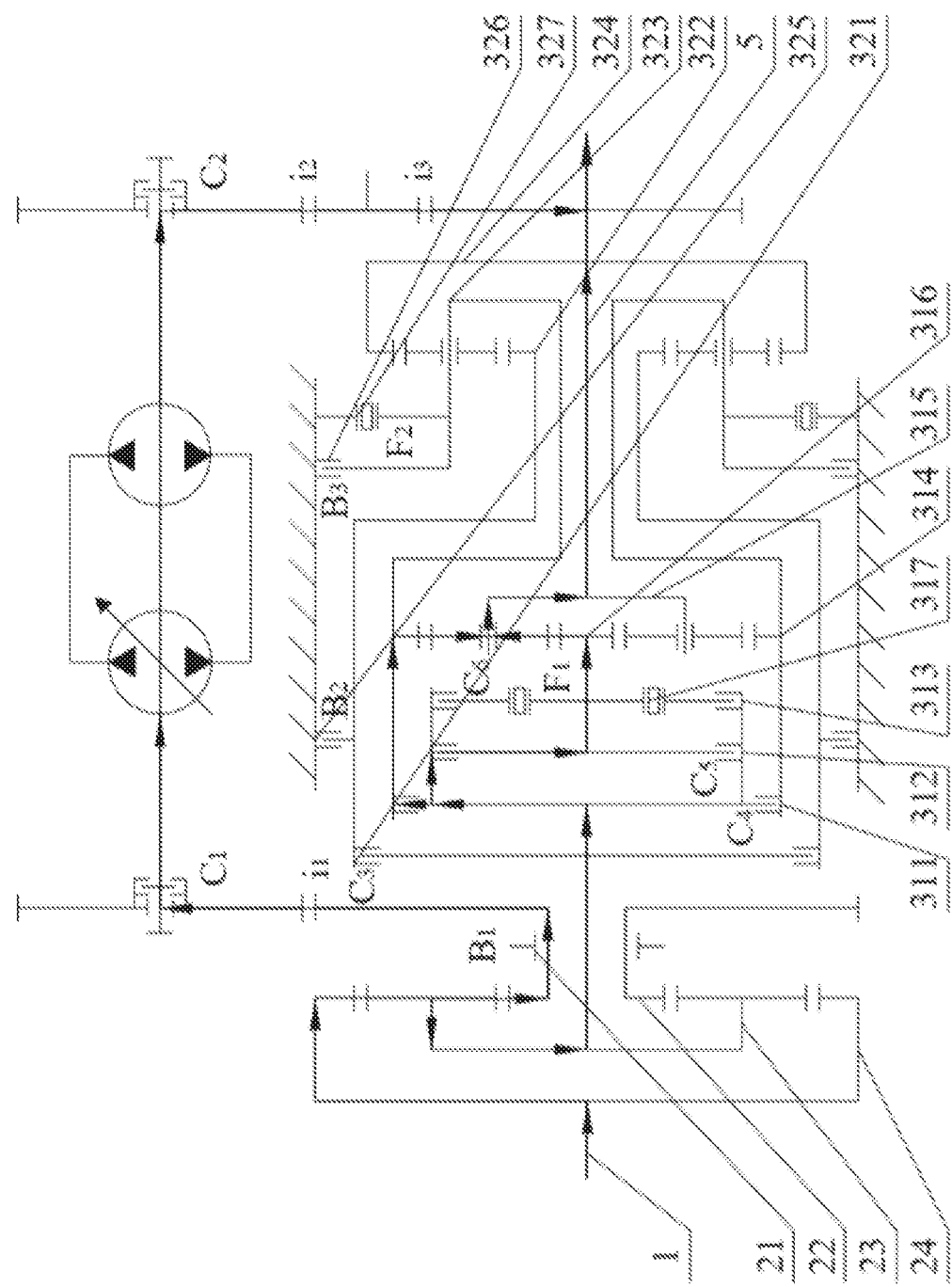
FIG. 9 is a schematic diagram showing the power flow in hybrid transmission gear-III in the present invention.

As shown in FIG. 9, in hybrid transmission gear-III, the first brake 325, the second brake 326, and the fourth clutch 321 are disengaged, while the first clutch 311 and the second clutch 312 are engaged; power passes through the split mechanism ring gear 24 and is split at the split mechanism planet carrier 23, a part of the power from the split mechanism planet carrier 23 passes through the split mechanism sun gear 22 to the hydraulic transmission assembly 4, the other part of the power is input from the split mechanism planet carrier 23 to the second clutch 312, then split into the front planetary-gear-set ring gear 314 and the front planetary-gear-set sun gear 316 respectively, and converged at the front planetary-gear-set planet carrier 315, and the power in the mechanical transmission assembly 3 and the power in the hydraulic transmission assembly 4 are converged and output from the output shaft 5.

Figure 10:
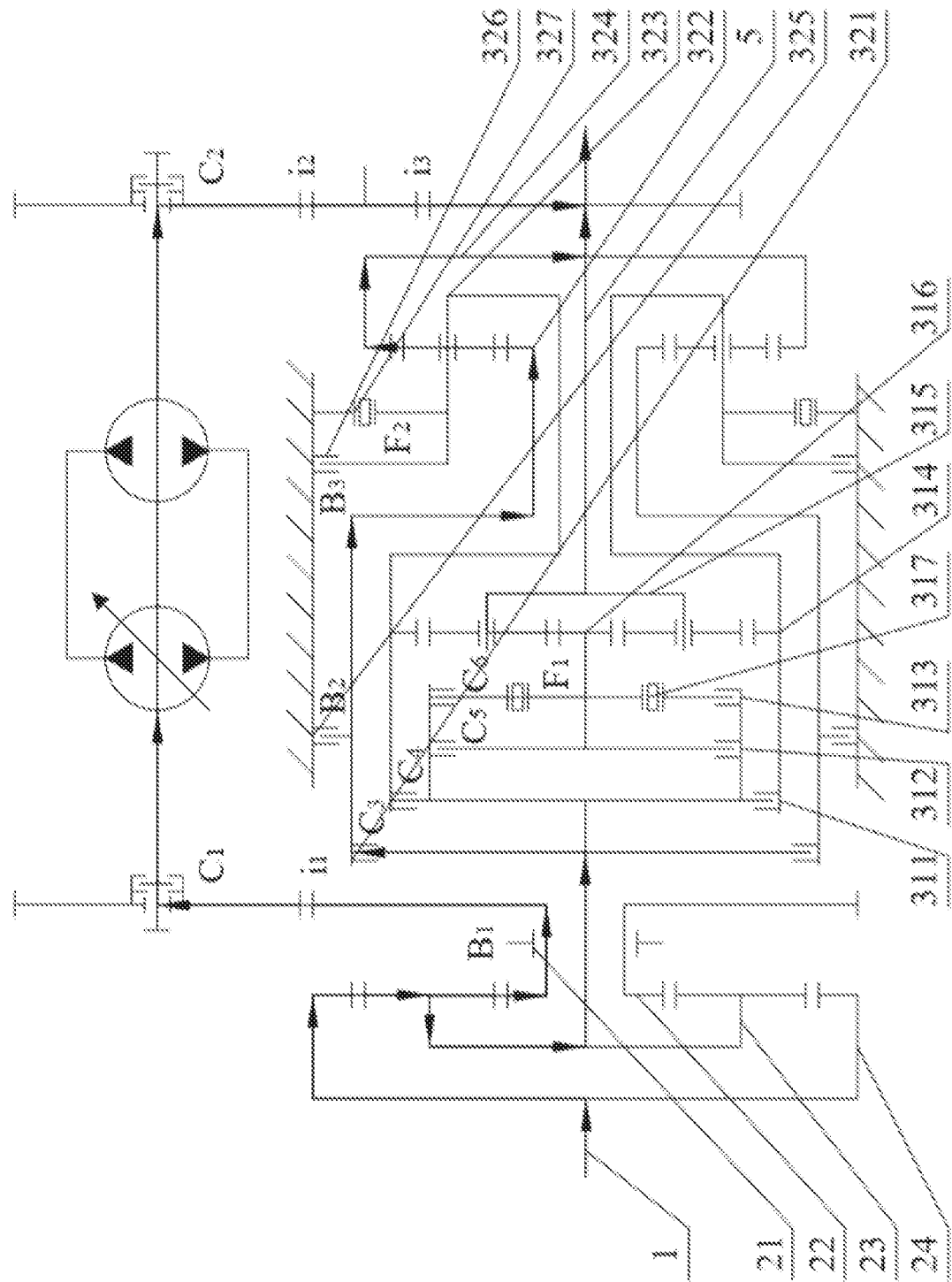
FIG. 10 is a schematic diagram showing the power flow in hybrid transmission gear-IV in the present invention.

As shown in FIG. 10, in hybrid transmission gear-IV, the first brake 325, the first clutch 311, and the second clutch 312 are disengaged, while the second brake 326 and the fourth clutch 321 are engaged; power passes through the split mechanism ring gear 24 and is split at the split mechanism planet carrier 23, a part of the power from the split mechanism planet carrier 23 passes through the split mechanism sun gear 22 to the hydraulic transmission assembly 4, the other part of the power from the split mechanism planet carrier 23 sequentially passes through the fourth clutch 321, the rear planetary-gear-set sun gear 322, and the rear planetary-gear-set ring gear 324 to the output shaft 5, and the power in the mechanical transmission assembly 3 and the power in the hydraulic transmission assembly 4 are converged and output from the output shaft 5.

During gear shift in the hydro-mechanical hybrid transmission mode, the shift from hybrid transmission gear-I to hybrid transmission gear-II involves two gear-shift components, the shift from hybrid transmission gear-II to hybrid transmission gear-III involves two gear-shift components, the shift from hybrid transmission gear-III to hybrid transmission gear-IV involves four gear-shift components, the shift from hybrid transmission gear-I to hybrid transmission gear-III involves two gear-shift components, the shift from hybrid transmission gear-I to hybrid transmission gear-IV involves two gear-shift components, and the shift from hybrid transmission gear-II to hybrid transmission gear-IV involves four gear-shift components.

As for gear shift involving two or less gear-shift components, an optimization solution is derived from not more than three tests; as for gear shift involving three or four gear-shift components with no interaction, an orthogonal array is used for analysis; as for gear shift involving four gear-shift components, four columns of the orthogonal array are made full use of; as for gear shift involving three gear-shift components, any three columns of the orthogonal array are selected.

The variation, change rate, and quadratic differential and time of the angular velocity of the output shaft are determined as evaluation indexes, "advance", "on-time", and "delay" shifts are selected as three levels, and orthogonal analysis with interaction is performed; test data is acquired through tests; the sum of squares of deviations and the degree of freedom of each factor and error are determined according to an analysis of variance table and are compared with a critical value, to determine the significance of each factor and error; a preferred solution of each evaluation index is obtained, and an optimization solution is determined according to a weighting coefficient; and shift timing data of the gear-shift mechanism obtained in different working conditions are grouped and used for controlling the shift timing of each group of the gear-shift components.

The control method of gear shift in the hydro-mechanical hybrid transmission mode specifically includes the following steps.

1) The variation α, change rate β, and quadratic differential γ and time t of the angular velocity of the output shaft are selected as evaluation indexes, wherein α, β, and γ are respectively zero-order, first-order, and second-order differentials of the rotation speed and are together with the time t to form spatio-temporal evaluation indexes.

The variation of the angular velocity of the output shaft is defined as:

$$\alpha = |\overline{\omega}_0 - \omega_{0\,min}|$$

wherein α is variation of the angular velocity of the output shaft, $\overline{\omega}_0$ is steady-state angular velocity of the output shaft, and $\omega_{0\,min}$ is minimum angular velocity of the output shaft.

The change rate of the angular velocity of the output shaft is defined as:

$$\beta = \frac{d\omega}{dt}$$

wherein β is change rate of the angular velocity of the output shaft.

The torque of the output shaft is:

$$T_0 = \beta \cdot J_0$$

wherein $T_0$ is torque of the output shaft, and $J_0$ is rotational inertia of the output shaft.

The quadratic differential of the angular velocity of the output shaft is:

$$\gamma = \frac{d\beta}{dt} = \frac{d^2\omega}{dt^2}$$

wherein γ is quadratic differential of the angular velocity of the output shaft.

Jerk is the change rate of the longitudinal acceleration of a vehicle:

$$j = \frac{r_d}{i_g i_0}\gamma$$

wherein j is jerk, $r_d$ is tire power radius, $i_g$ is gear ratio, and $i_0$ is drive axle ratio.

2) An $L_9(3^4)$ orthogonal array is established as shown in Table 2, wherein "1", "2", and "3" are three levels, respectively representing "advance", "on-time", and "delay" shifts of related gear-shift components; "a", "b", "c", and "d" are four factors, respectively representing gear-shift components with no interaction; n is the total number of tests, n=9, and $K_i^F$ is the sum of test results related to the $i^{th}$ level of the factor (i∈(1, 2, 3) , F∈(a, b, c, d).

The shift from hybrid transmission gear-II to hybrid transmission gear-IV is taken as an example.

It is determined that "four factors" are the brake B2, the brake B3, the clutch C3, and the clutch C5, and the shift timing of the four gear-shift components influences the shift quality of the transmission system.

The "advance", "on-time", and "delay" shifts of the gear-shift components are selected as "three levels". The "advance" time and "delay" time can be selected according to the actual situations, and can be identical or different. In this embodiment, the "advance" time and "delay" time are selected as 0.3 s.

TABLE 2

Orthogonal array of component shift timing in the hydro-mechanical hybrid transmission mode

| | a<br>1 | b<br>2 | c<br>3 | d<br>4 | Test result<br>$x_i$ |
|---|---|---|---|---|---|
| 1 | 1 | 1 | 1 | 1 | |
| 2 | 1 | 2 | 2 | 2 | |
| 3 | 1 | 3 | 3 | 3 | |
| 4 | 2 | 1 | 2 | 3 | |
| 5 | 2 | 2 | 3 | 1 | |
| 6 | 2 | 3 | 1 | 2 | |
| 7 | 3 | 1 | 3 | 2 | |
| 8 | 3 | 2 | 1 | 3 | |
| 9 | 3 | 3 | 2 | 1 | |

The expression of the symbols in Table 2 is as follows:

$$k_i^F = \frac{K_i^F}{3}$$

The range is:

$$R^F = \max\left\{|k_i^F - k_j^F|\right\}$$

The order of priority of the factors is determined through the range data, the preferred solution of each evaluation index is determined, and finally the optimal solution is determined according to the weighting coefficient.

The optimal solution is determined by:

$$\begin{cases} \xi = \sum_{k=1}^{N} \lambda_k \xi_k \\ \xi_k \in [\xi_{kmin}, \xi_{kmax}] \end{cases}$$

wherein ξ is a comprehensive evaluation index, $\xi_k$ is a single evaluation index, $\xi_{kmin}/\xi_{kmax}$ is upper/lower limit of a single evaluation index, and $\lambda_k$ is a weighting coefficient.

3) An orthogonal array header is designed, a test scheme is specified, and 9 tests are conducted to obtain test results.

4) The range is calculated according to the test results, the order of priority of the factors is determined, the preferred solution of each evaluation index $\xi_k$ is obtained, and the optimization solution is determined according to the weighting coefficient $\lambda_k$.

The optimization solution of the hydro-mechanical hybrid gear is determined by the following formulas:

$$\begin{cases} \xi = \sum_{k=1}^{N} \lambda_k \xi_k \\ \xi_k \in [\xi_{kmin}, \xi_{kmax}] \end{cases}$$

wherein $\xi$ is a comprehensive evaluation index, $\xi_k$ is a single evaluation index, $\xi_{kmin}/\xi_{kmax}$ is upper/lower limit of a single evaluation index, and $\lambda_k$ is a weighting coefficient.

5) If the optimization solution does not meet the requirement, the "advance" time and "delay" time are increased or reduced, or different "advance" time and "delay" time are selected, till the optimization solution meets the requirement.

The shift timing data of the gear-shift mechanism obtained in different working conditions are grouped and input into a shift controller, and by controlling the shift timing of each group of the gear-shift devices, it is ensured that good shift quality is achieved in each gear-shift process of the same transmission mode.

The shift from hybrid transmission gear-III to hybrid transmission gear-IV can be implemented in the same manner, and only the corresponding "four factors" and "three levels" need to be changed.

During gear shift in the pure mechanical transmission mode, the shift from mechanical gear-I to mechanical gear-II involves one gear-shift component, the shift from mechanical gear-II to mechanical gear-III involves one gear-shift component, the shift from mechanical gear-III to mechanical gear-IV involves three gear-shift components, the shift from mechanical gear-I to mechanical gear-III involves two gear-shift components, the shift from mechanical gear-I to mechanical gear-IV involves five gear-shift components, and the shift from mechanical gear-II to mechanical gear-IV involves four gear-shift components.

As for gear shift involving two or less gear-shift components, an optimization solution is derived from not more than three tests; as for gear shift involving three gear-shift components, two of which have interaction, gear shift involving five gear-shift components, three of which have interaction, and gear shift involving four gear-shift components, two of which have interaction, an orthogonal array is used for analysis, and a corresponding list is selected during the analysis.

The variation, change rate, and quadratic differential and time of the angular velocity of the output shaft are determined as evaluation indexes, "advance", "on-time", and "delay" shifts are selected as three levels, and orthogonal analysis with no interaction is performed; test data is acquired through tests; the range is calculated according to the test data, the order of priority of the factors is determined, and the preferred solution of each evaluation index is obtained; the optimization solution is determined according to the weighting coefficient; and gear shift is controlled by paired matrixing programs formed by the optimization solutions in different working conditions.

The control method of gear shift in the pure mechanical transmission mode specifically includes the following steps.

1) The variation $\alpha$, change rate $\beta$, and quadratic differential $\gamma$ and time t of the angular velocity of the output shaft are selected as evaluation indexes, wherein $\alpha$, $\beta$, and $\gamma$ are respectively zero-order, first-order, and second-order differentials of the rotation speed and are together with the time t to form spatio-temporal evaluation indexes.

The variation $\beta$ of the angular velocity of the output shaft
The variation of the angular velocity of the output shaft is defined as:

$$\alpha = |\overline{\omega}_0 - \omega_{0\,min}|$$

wherein $\alpha$ is variation of the angular velocity of the output shaft, $\overline{\omega}_0$ is steady-state angular velocity of the output shaft, and $\omega_{0\,min}$ is minimum angular velocity of the output shaft.

The change rate of the angular velocity of the output shaft is defined as:

$$\beta = \frac{d\omega}{dt}$$

wherein $\beta$ is change rate of the angular velocity of the output shaft.

The torque of the output shaft is determined by the formula (3):

$$T_0 = \beta \cdot J_0$$

wherein $T_0$ is torque of the output shaft, and $J_0$ is rotational inertia of the output shaft.

The quadratic differential of the angular velocity of the output shaft is defined as:

$$\gamma = \frac{d\beta}{dt} = \frac{d^2\omega}{dt^2}$$

wherein $\gamma$ is quadratic differential of the angular velocity of the output shaft.

Jerk is the change rate of the longitudinal acceleration of a vehicle and is determined by the formula (5):

$$j = \frac{r_d}{i_g i_0} \gamma$$

wherein j is jerk, $r_d$ is tire power radius, $i_g$ is gear ratio, and $i_0$ is drive axle ratio.

2) An $L_{27}(3^{13})$ orthogonal array as shown in Table 3 is established, wherein "1", "2", and "3" respectively represent "advance", "on-time", and "delay" shifts of related gear-shift components; "a" and "b" respectively represent gear-shift components with no interaction; "c", "d", and "e" respectively represent gear-shift components with interaction.

The shift from mechanical gear-I to mechanical gear-IV is taken as an example.

It is determined that "five factors" are the brake B2, the clutch C4, the clutch C6, the one-way clutch F1, and the one-way clutch F2, and the shift timing of the five gear-shift components influences the shift quality of the transmission system. Among the "five factors", the brake B2 and the clutch C4 have no interaction, while the clutch C6, the one-way clutch F1, and the one-way clutch F2 have interaction.

The "advance", "on-time", and "delay" shifts of the gear-shift components are selected as "three levels". The "advance" time and "delay" time can be selected according to the actual situations, and can be identical or different. In this embodiment, since a lot of components are involved and some of them have interaction, the "advance" time and "delay" time are selected as 0.5 s.

TABLE 3

Orthogonal array of component shift timing in the mechanical transmission mode

| | Test factor | | | | | | | | | | | Test | |
|---|---|---|---|---|---|---|---|---|---|---|---|---|---|
| No. | e<br>1 | c<br>2 | e × c$_1$<br>3 | e × c$_2$<br>4 | d<br>5 | e × d$_1$<br>6 | e × d$_2$<br>7 | c × d$_1$<br>8 | a<br>9 | b<br>10 | c × d$_2$<br>11 | result<br>x$_i$ | x$_i^2$ |
| 1 | 1 | 1 | 1 | 1 | 1 | 1 | 1 | 1 | 1 | 1 | 1 | | |
| 2 | 1 | 1 | 1 | 1 | 2 | 2 | 2 | 2 | 2 | 2 | 2 | | |
| 3 | 1 | 1 | 1 | 1 | 3 | 3 | 3 | 3 | 3 | 3 | 3 | | |
| 4 | 1 | 2 | 2 | 2 | 1 | 1 | 1 | 2 | 2 | 2 | 3 | | |
| 5 | 1 | 2 | 2 | 2 | 2 | 2 | 2 | 3 | 3 | 3 | 1 | | |
| 6 | 1 | 2 | 2 | 2 | 3 | 3 | 3 | 1 | 1 | 1 | 2 | | |
| 7 | 1 | 3 | 3 | 3 | 1 | 1 | 1 | 3 | 3 | 3 | 2 | | |
| 8 | 1 | 3 | 3 | 3 | 2 | 2 | 2 | 1 | 1 | 1 | 3 | | |
| 9 | 1 | 3 | 3 | 3 | 3 | 3 | 3 | 2 | 2 | 2 | 1 | | |
| 10 | 2 | 1 | 2 | 3 | 1 | 2 | 3 | 1 | 2 | 3 | 3 | | |
| 11 | 2 | 1 | 2 | 3 | 2 | 3 | 1 | 2 | 3 | 1 | 1 | | |
| 12 | 2 | 1 | 2 | 3 | 3 | 1 | 2 | 3 | 1 | 2 | 2 | | |
| 13 | 2 | 2 | 3 | 1 | 1 | 2 | 3 | 2 | 3 | 1 | 2 | | |
| 14 | 2 | 2 | 3 | 1 | 2 | 3 | 1 | 3 | 1 | 2 | 3 | | |
| 15 | 2 | 2 | 3 | 1 | 3 | 1 | 2 | 1 | 2 | 3 | 1 | | |
| 16 | 2 | 3 | 1 | 2 | 1 | 2 | 3 | 3 | 1 | 2 | 1 | | |
| 17 | 2 | 3 | 1 | 2 | 2 | 3 | 1 | 1 | 2 | 3 | 2 | | |
| 18 | 2 | 3 | 1 | 2 | 3 | 1 | 2 | 2 | 3 | 1 | 3 | | |
| 19 | 3 | 1 | 3 | 2 | 1 | 3 | 2 | 1 | 3 | 2 | 2 | | |
| 20 | 3 | 1 | 3 | 2 | 2 | 1 | 3 | 2 | 1 | 3 | 3 | | |
| 21 | 3 | 1 | 3 | 2 | 3 | 2 | 1 | 3 | 2 | 1 | 1 | | |
| 22 | 3 | 2 | 1 | 3 | 1 | 3 | 2 | 2 | 3 | 1 | 1 | | |
| 23 | 3 | 2 | 1 | 3 | 2 | 1 | 3 | 3 | 1 | 2 | 2 | | |
| 24 | 3 | 2 | 1 | 3 | 3 | 2 | 1 | 1 | 2 | 3 | 3 | | |
| 25 | 3 | 3 | 2 | 1 | 1 | 3 | 2 | 3 | 3 | 1 | 3 | | |
| 26 | 3 | 3 | 2 | 1 | 2 | 1 | 3 | 1 | 2 | 2 | 1 | | |
| 27 | 3 | 3 | 2 | 1 | 3 | 2 | 1 | 2 | 1 | 3 | 2 | | |
| K$_1$ | K$_1^e$ | K$_1^c$ | K$_1^{exc1}$ | K$_1^{exc2}$ | K$_1^d$ | K$_1^{exd1}$ | K$_1^{exd2}$ | K$_1^{cxd1}$ | K$_1^a$ | K$_1^b$ | K$_1^{cxd2}$ | K | W |
| K$_2$ | K$_2^e$ | K$_2^c$ | K$_2^{exc1}$ | K$_2^{exc2}$ | K$_2^d$ | K$_2^{exd1}$ | K$_2^{exd2}$ | K$_2^{cxd1}$ | K$_2^a$ | K$_2^b$ | K$_2^{cxd2}$ | | |
| K$_3$ | K$_3^e$ | K$_3^c$ | K$_3^{exc1}$ | K$_3^{exc2}$ | K$_3^d$ | K$_3^{exd1}$ | K$_3^{exd2}$ | K$_3^{cxd1}$ | K$_3^a$ | K$_3^b$ | K$_3^{cxd2}$ | | |
| U | U$_e$ | U$_c$ | U$_{exc1}$ | U$_{exc2}$ | U$_d$ | U$_{exd1}$ | U$_{exd2}$ | U$_{cxd1}$ | U$_a$ | U$_b$ | U$_{cxd2}$ | P | |
| Q | Q$_e$ | Q$_c$ | Q$_{exc1}$ | Q$_{exc2}$ | Q$_d$ | Q$_{exd1}$ | Q$_{exd2}$ | Q$_{cxd1}$ | Q$_a$ | Q$_b$ | Q$_{cxd2}$ | | | n is the total number of tests, n=27 and $K_i^F$ is the sum of test results related to the i$^{th}$ level of the factor (i∈(1, 2, 3), F∈(e, c, exc1, exc2, d, exd1, exd2, cxd1, a, b, cxd2).

The expressions of the symbols in Table 3 are as follows:

$$K = K_1 + K_2 + K_3 = \sum_{i=1}^{27} x_i$$

$$W = \sum_{i=1}^{27} x_i^2$$

$$P = \frac{K^2}{27}$$

$$U_F = \frac{\sum_{i=1}^{3} (K_i^F)^2}{3}$$

3) An orthogonal array header is designed as shown in Table 3, a test scheme is specified and 27 tests are conducted to obtain test results x$_i$(i=1, . . . , 27), and related statistical values are calculated.

4) The sum of squares of deviations, the degree of freedom, and the F value of each factor and error are determined according to an analysis of variance table, and are compared with a critical value to determine the significance of each factor and error.

TABLE 4

Analysis of variance table of component shift timing in the mechanical transmission mode

| Source | Sum of squares of deviations | Degree of freedom | Mean sum of squares of deviations | F value | Critical value | Significance value | Optimal solution |
|---|---|---|---|---|---|---|---|
| E | Q$_E$ | 2 | $\frac{Q_E}{2}$ | $\frac{2Q_E}{Q_e}$ | F$_a$(2,4) | | Judge the significance of the factor E |
| C | Q$_C$ | 2 | $\frac{Q_C}{2}$ | $\frac{2Q_C}{Q_e}$ | F$_a$(2,4) | | Judge the significance of the factor C |

TABLE 4-continued

Analysis of variance table of component shift timing in the mechanical transmission mode

| Source | Sum of squares of deviations | Degree of freedom | Mean sum of squares of deviations | F value | Critical value | Significance value | Optimal solution |
|---|---|---|---|---|---|---|---|
| E × C | $Q_{E \times C1} + Q_{E \times C2}$ ($Q_{E \times C}$) | 4 | $\dfrac{Q_{E \times C}}{4}$ | $\dfrac{Q_{E \times C}}{Q_e}$ | $F_a(4,4)$ | | Judge that the interaction is significant |
| D | $Q_D$ | 2 | $\dfrac{Q_D}{2}$ | $\dfrac{2Q_D}{Q_e}$ | $F_a(2,4)$ | | Judge the significance of the factor D |
| E × D | $Q_{E \times D1} + Q_{E \times D2}$ ($Q_{E \times D}$) | 4 | $\dfrac{Q_{E \times D}}{4}$ | $\dfrac{Q_{E \times D}}{Q_e}$ | $F_a(4,4)$ | | Judge that the interaction is significant |
| C × D | $Q_{C \times D1} + Q_{C \times D2}$ ($Q_{C \times D}$) | 4 | $\dfrac{Q_{C \times D}}{4}$ | $\dfrac{Q_{C \times D}}{Q_e}$ | $F_a(4,4)$ | | Judge that the interaction is significant |
| A | $Q_A$ | 2 | $\dfrac{Q_A}{2}$ | $\dfrac{2Q_A}{Q_e}$ | $F_a(2,4)$ | | Judge the significance of the factor A |
| B | $Q_B$ | 2 | $\dfrac{Q_B}{2}$ | $\dfrac{2Q_B}{Q_e}$ | $F_a(2,4)$ | | Judge the significance of the factor B |
| e* | $Q_e$ | 4 | $\dfrac{Q_e}{4}$ | | $F_a(4,4)$ | | |

The total sum of squares of deviations $Q_T$, the sum of squares of deviations of each factor $Q_F$, and the sum of squares of deviations of each error $Q_e$, are respectively:

$$Q_T = W - P = \Sigma Q_F + Q_e$$

$$Q_F = U_F - P$$

The total degree of freedom $f_T = 26$, the degree of freedom of each factor $f_F = 2$, and the degree of freedom of each error $f_e = 4$.

The mean sums of squares of deviations of the factors and errors are:

$$S_F^2 = \frac{Q_F}{f_F}$$

$$S_e^2 = \frac{Q_e}{f_e}$$

The F value is:

$$F_F = \frac{S_F^2}{S_e^2}$$

The analysis of variance table of component shift timing in the mechanical transmission mode is shown in Table 1.

The sources of variance mainly lie in three parts: (1) "a", "b", "c", "d", and "e"; (2) "e×c" (including e×c1 and e×c2), "e×d" (including e×d1 and e×d2), and "c×d" (including c×d1 and c×d2); (3) errors e*.

The $F_F$ value is compared with the $F_\alpha(f_F, f_e)$ value according to the calculated sum of squares of deviations, degree of freedom, and mean sum of squares of deviations of each factor and error in the sources of variance.

If $F_F > F_\alpha(f_F, f_e)$, the influence of the factor is significant and vice versa. The factors of significant influence are selected, and the importance and the order of priority of each factor are intuitively analyzed to determine an optimal gear-shift solution.

The optimization solution of the mechanical gear is determined by the following formulas:

$$\begin{cases} \zeta = \sum_{k=1}^{N} \mu_k \zeta_k \\ \zeta_k \in [\zeta_{kmin}, \zeta_{kmax}] \end{cases} ;$$

wherein $\xi$ is a comprehensive evaluation index, $\xi_k$ is a single evaluation index, $\xi_{kmin}/\xi_{kmax}$ is upper/lower limit of a single evaluation index, and $\mu k$ is a weighting coefficient;

The shift timing data of the gear-shift mechanism obtained in different working conditions are grouped and input into a shift controller, and by controlling the shift timing of each group of the gear-shift devices, it is ensured that good shift quality is achieved in each gear-shift process of the same transmission mode.

The shift from mechanical gear-III to mechanical gear-IV involves three gear-shift components, two of which, namely, the third clutch 313 and the first one-way clutch 317, have interaction. The $L_9(3^4)$ orthogonal array can be used for analysis, and only the fourth factor column needs to be replaced by an interaction column.

The shift from mechanical gear-II to mechanical gear-IV involves four gear-shift components, two of which, namely, the third clutch 313 and the first one-way clutch 317, have interaction. The $L_{27}(3^{13})$ orthogonal array can be used for analysis, and the related redundant columns are vacant.

What is claimed is:

1. A hydro-mechanical hybrid transmission device with multiple power distribution modes, comprising an input shaft, a split mechanism, a mechanical transmission assembly, a hydraulic transmission assembly, and an output shaft, wherein the input shaft is connected, through the split mechanism, to the mechanical transmission assembly and the hydraulic transmission assembly, wherein mechanical transmission assembly and the hydraulic transmission assembly are connected in parallel, and the mechanical transmission assembly and the hydraulic transmission assembly are both connected to the output shaft, wherein the mechanical transmission assembly comprises a front planetary-gear-set assembly and a rear planetary-gear-set assembly, wherein the front planetary-gear-set assembly and the rear planetary-gear-set assembly are connected in series;

the front planetary-gear-set assembly comprises a first clutch, a second clutch, a third clutch, a front planetary-gear-set ring gear, a front planetary-gear-set planet carrier, a front planetary-gear-set sun gear, and a first one-way clutch, wherein the first clutch is arranged between the split mechanism and the front planetary-gear-set ring gear, the second clutch and the third clutch are connected in parallel and are respectively connected to the front planetary-gear-set sun gear, the first one-way clutch is arranged between the third clutch and the front planetary-gear-set sun gear, and the output shaft is connected to the front planetary-gear-set planet carrier;

the rear planetary-gear-set assembly comprises a fourth clutch, a rear planetary-gear-set sun gear, a rear planetary-gear-set planet carrier, a rear planetary-gear-set ring gear, a first brake, a second brake, and a second one-way clutch, wherein the fourth clutch is arranged between the split mechanism and the rear planetary-gear-set sun gear, the first brake is connected to the rear planetary-gear-set sun gear, the rear planetary-gear-set planet carrier is connected to the front planetary-gear-set ring gear and is connected to the second brake and the second one-way clutch, wherein the second brake and the second one-way clutch are connected in parallel, and the rear planetary-gear-set ring gear is connected to the output shaft.

2. The hydro-mechanical hybrid transmission device according to claim 1, wherein the hydraulic transmission assembly comprises a hydraulic transmission input clutch, a hydraulic transmission input gear pair, a hydraulic pump, a hydraulic oil pipe, a hydraulic motor, a hydraulic transmission output gear pair, and a hydraulic transmission output clutch, wherein the hydraulic pump is connected to the split mechanism through the hydraulic transmission input gear pair, the hydraulic transmission input clutch is arranged between the hydraulic transmission input gear pair and the hydraulic pump, the hydraulic pump is connected to the hydraulic motor through the hydraulic oil pipe, the hydraulic motor is connected to the output shaft through the hydraulic transmission output gear pair, and the hydraulic transmission output clutch is arranged between the hydraulic motor and the hydraulic transmission output gear pair.

3. The hydro-mechanical hybrid transmission device according to claim 2, wherein the split mechanism comprises a split brake, a split mechanism sun gear, a split mechanism planet carrier, and a split mechanism ring gear, wherein the input shaft is connected to the split mechanism ring gear, the split mechanism sun gear is connected to the hydraulic transmission assembly, the split brake is arranged on the split mechanism sun gear, and the split mechanism planet carrier is connected to the mechanical transmission assembly.

4. A control method of the hydro-mechanical hybrid transmission device with multiple power distribution modes according to claim 3, comprising three modes of transmission: a pure hydraulic transmission mode, a hydro-mechanical hybrid transmission mode, and a pure mechanical transmission mode, wherein the three modes of transmission are implemented through combination and engagement/disengagement of brakes and clutches as follows:

in the pure hydraulic transmission mode, the first brake, the hydraulic transmission input clutch, the hydraulic transmission output clutch, and the fourth clutch are engaged, while the other clutches and brakes are disengaged; when the fourth clutch and the first brake are engaged, the split mechanism planet carrier is braked; and when the hydraulic transmission input clutch and the hydraulic transmission output clutch are engaged, mechanical power passes through the input shaft, the split mechanism ring gear, the split mechanism sun gear, the hydraulic transmission input gear pair, and the input clutch to drive the hydraulic pump to work, the hydraulic pump converts the mechanical power into high-pressure oil, the high-pressure oil passes through the hydraulic pipe to drive the hydraulic motor to work, and the mechanical power output by the hydraulic motor is transmitted through the hydraulic transmission output clutch and the hydraulic transmission output gear pair to the output shaft;

in the pure mechanical transmission mode, the split brake is engaged, the hydraulic transmission input clutch, the hydraulic transmission output clutch, the second brake, and the fourth clutch are disengaged, and shift between gears of different transmission ratios in the pure mechanical transmission mode is implemented through combination of the other clutches and brakes; when the split brake is engaged while the hydraulic transmission input clutch and the hydraulic transmission output clutch are disengaged, no mechanical power is input into the hydraulic transmission assembly, and mechanical power is transmitted through the input shaft, the split mechanism ring gear, and the split mechanism planet carrier to the mechanical transmission assembly, and is then output from the output shaft after a speed ratio adjustment at the mechanical transmission assembly;

in the hydro-mechanical hybrid transmission mode, the hydraulic transmission input clutch and the hydraulic transmission output clutch are engaged, the split brake, the third clutch, the first one-way clutch, and the second one-way clutch are disengaged, and shift between gears of different transmission ratios in the hydro-mechanical hybrid transmission mode is implemented through combination of the other clutches and brakes; mechanical power passes through the input shaft and the split mechanism ring gear to the split mechanism planet carrier, and is split at the split mechanism planet carrier into the mechanical transmission assembly and the split mechanism sun gear respectively; since the split mechanism sun gear is connected to the hydraulic transmission assembly, the mechanical power is finally converged and output from the output shaft.

5. The control method according to claim 4, wherein the pure mechanical transmission mode comprises a first mechanical transmission gear, a second mechanical transmission gear, a third mechanical transmission gear, and a fourth mechanical transmission gear, as follows:

in the first mechanical transmission gear, the first brake, the first clutch, and the second clutch are disengaged, while the third clutch, the first one-way clutch, and the second one-way clutch are engaged; mechanical power from the split mechanism planet carrier sequentially passes through the third clutch, the first one-way clutch, the front planetary-gear-set sun gear, and the front planetary-gear-set planet carrier to the output shaft;

in the second mechanical transmission gear, the first brake, the first clutch, the second clutch, and the second one-way clutch are disengaged, while the third clutch and the first one-way clutch are engaged; the mechanical power from the split mechanism planet carrier sequentially passes through the third clutch, the first one-way clutch, and the front planetary-gear-set sun gear to the front planetary-gear-set planet carrier, and is split at the front planetary-gear-set planet carrier into the output shaft and the front planetary-gear-set ring gear respectively; the mechanical power in the front planetary-gear-set ring gear is sequentially transmitted to the rear planetary-gear-set planet carrier and the rear planetary-gear-set ring gear and is finally converged to the output shaft;

in the third mechanical transmission gear, the first brake, the second clutch, and the second one-way clutch are disengaged, while the first clutch, the third clutch, and the first one-way clutch are engaged; the mechanical power is input from the split mechanism planet carrier to the first clutch, then split into the front planetary-gear-set ring gear and the front planetary-gear-set sun gear respectively, and converged at the front planetary-gear-set planet carrier and finally output from the output shaft;

in the fourth mechanical transmission gear, the second clutch, the third clutch, the first one-way clutch, and the second one-way clutch are disengaged, while the first clutch and the first brake are engaged; the mechanical power from the split mechanism planet carrier sequentially passes through the first clutch, the front planetary-gear-set ring gear, the rear planetary-gear-set planet carrier, and the rear planetary-gear-set ring gear and is output from the output shaft.

6. The control method according to claim 5, wherein during a gear shift in the pure mechanical transmission mode, a gear shift from the first mechanical transmission gear to the second mechanical transmission gear involves one gear-shift component, a gear shift from the second mechanical transmission gear to the third mechanical transmission gear involves one gear-shift component, a gear shift from the third mechanical transmission gear to the fourth mechanical transmission gear involves three gear-shift components, a gear shift from the first mechanical transmission gear to the third mechanical transmission gear involves two gear-shift components, a gear shift from mechanical transmission gear to the fourth mechanical transmission gear involves five gear-shift components, and a gear shift from the second mechanical transmission gear to the fourth mechanical transmission gear involves four gear-shift components;

as for gear shifts involving two or less gear-shift components, an optimization solution is derived from not more than three tests; as for gear shifts involving three gear-shift components, two of the three gear-shift components have interaction, gear shifts involving five gear-shift components, three of the five gear-shift components have interaction, and gear shifts involving four gear-shift components, two of the four gear-shift components have interaction, an orthogonal array is used for analysis, and a corresponding list is selected during the analysis;

a variation, a change rate, a quadratic differential and a time of an angular velocity of the output shaft are determined as evaluation indexes, "advance", "on-time", and "delay" shifts are selected as three levels, and an orthogonal analysis with no interaction is performed; test data are acquired through tests; a range is calculated according to the test data, an order of priority of each of the factors is determined, and a preferred solution of each of the evaluation indexes is obtained; the optimization solution is determined according to a weighting coefficient; and the gear shift is controlled by paired matrixing programs formed by the optimization solutions in different working conditions.

7. The control method according to claim 6, wherein the gear shift in the pure mechanical transmission mode is controlled by the control method comprising the following steps:

1) selecting a variation $\alpha$, a change rate $\beta$, and a quadratic differential $\gamma$ and a time t of the angular velocity of the output shaft as the evaluation indexes, wherein $\alpha$, $\beta$, and $\gamma$ are respectively zero-order, first-order, and second-order differentials of the rotation speed and are together with the time t to form spatio-temporal evaluation indexes;

the variation of the angular velocity of the output shaft is:

$$\alpha = |\overline{\omega}_0 - \omega_{0\,min}|;$$

wherein $\alpha$ is the variation of the angular velocity of the output shaft, $\overline{\omega}_0$ is a steady-state angular velocity of the output shaft, and $\omega_{0\,min}$ is a minimum angular velocity of the output shaft;

the change rate of the angular velocity of the output shaft is defined as:

$$\beta = \frac{d\omega}{dt};$$

wherein $\beta$ is the change rate of the angular velocity of the output shaft;

a torque of the output shaft is:

$$T_0 = \beta \cdot J_0;$$

wherein $T_0$ is the torque of the output shaft, and $J_0$ is a rotational inertia of the output shaft;

the quadratic differential of the angular velocity of the output shaft is:

$$\gamma = \frac{d\beta}{dt} = \frac{d^2\omega}{dt^2};$$

wherein $\gamma$ is the quadratic differential of the angular velocity of the output shaft;

a jerk is a change rate of a longitudinal acceleration of a vehicle:

$$j = \frac{r_d}{i_g i_0}\gamma;$$

wherein j is the jerk, $r_d$ is a tire power radius, $i_g$ is a gear ratio, and $i_0$ is a drive axle ratio;

2) establishing an $L_{27}(3^{13})$ orthogonal array as shown in Table 3, wherein "1", "2", and "3" respectively represent "advance", "on-time", and "delay" shifts of related gear-shift components; "a" and "b" respectively represent gear-shift components with no interaction; "c", "d", and "e" respectively represent gear-shift components with interaction;

n is a total number of tests, n=27 and $K_i^F$ is a sum of test results related to an $i_{th}$ level of a factor (i$\varepsilon$(1,2,3), F$\varepsilon$(e, c, exc1, exc2, d, exd1, exd2, cxd1, a, b, cxd2));

TABLE 3

Orthogonal array of component shift timing in the mechanical transmission mode

| No. | e 1 | c 2 | e × c$_1$ 3 | e × c$_2$ 4 | d 5 | e × d$_1$ 6 | e × d$_2$ 7 | c × d$_1$ 8 | a 9 | b 10 | c × d$_2$ 11 | Test result x$_i$ | x$_i^2$ |
|---|---|---|---|---|---|---|---|---|---|---|---|---|---|
| 1 | 1 | 1 | 1 | 1 | 1 | 1 | 1 | 1 | 1 | 1 | 1 | | |
| 2 | 1 | 1 | 1 | 1 | 2 | 2 | 2 | 2 | 2 | 2 | 2 | | |
| 3 | 1 | 1 | 1 | 1 | 3 | 3 | 3 | 3 | 3 | 3 | 3 | | |
| 4 | 1 | 2 | 2 | 2 | 1 | 1 | 1 | 2 | 2 | 2 | 3 | | |
| 5 | 1 | 2 | 2 | 2 | 2 | 2 | 2 | 3 | 3 | 3 | 1 | | |
| 6 | 1 | 2 | 2 | 2 | 3 | 3 | 3 | 1 | 1 | 1 | 2 | | |
| 7 | 1 | 3 | 3 | 3 | 1 | 1 | 1 | 3 | 3 | 3 | 2 | | |
| 8 | 1 | 3 | 3 | 3 | 2 | 2 | 2 | 1 | 1 | 1 | 3 | | |
| 9 | 1 | 3 | 3 | 3 | 3 | 3 | 3 | 2 | 2 | 2 | 1 | | |
| 10 | 2 | 1 | 2 | 3 | 1 | 2 | 3 | 1 | 2 | 3 | 3 | | |
| 11 | 2 | 1 | 2 | 3 | 2 | 3 | 1 | 2 | 3 | 1 | 1 | | |
| 12 | 2 | 1 | 2 | 3 | 3 | 1 | 2 | 3 | 1 | 2 | 2 | | |
| 13 | 2 | 2 | 3 | 1 | 1 | 2 | 3 | 2 | 3 | 1 | 2 | | |
| 14 | 2 | 2 | 3 | 1 | 2 | 3 | 1 | 3 | 1 | 2 | 3 | | |
| 15 | 2 | 2 | 3 | 1 | 3 | 1 | 2 | 1 | 2 | 3 | 1 | | |
| 16 | 2 | 3 | 1 | 2 | 1 | 2 | 3 | 3 | 1 | 2 | 1 | | |
| 17 | 2 | 3 | 1 | 2 | 2 | 3 | 1 | 1 | 2 | 3 | 2 | | |
| 18 | 2 | 3 | 1 | 2 | 3 | 1 | 2 | 2 | 3 | 1 | 3 | | |
| 19 | 3 | 1 | 3 | 2 | 1 | 3 | 2 | 1 | 3 | 2 | 2 | | |
| 20 | 3 | 1 | 3 | 2 | 2 | 1 | 3 | 2 | 1 | 3 | 3 | | |
| 21 | 3 | 1 | 3 | 2 | 3 | 2 | 1 | 3 | 2 | 1 | 1 | | |
| 22 | 3 | 2 | 1 | 3 | 1 | 3 | 2 | 2 | 3 | 3 | 1 | | |
| 23 | 3 | 2 | 1 | 3 | 2 | 1 | 3 | 3 | 1 | 1 | 2 | | |
| 24 | 3 | 2 | 1 | 3 | 3 | 2 | 1 | 1 | 2 | 2 | 3 | | |
| 25 | 3 | 3 | 2 | 1 | 1 | 3 | 2 | 3 | 3 | 1 | 3 | | |
| 26 | 3 | 3 | 2 | 1 | 2 | 1 | 3 | 1 | 2 | 2 | 1 | | |
| 27 | 3 | 3 | 2 | 1 | 3 | 2 | 1 | 2 | 1 | 3 | 2 | | |
| K$_1$ | K$_1^e$ | K$_1^c$ | K$_1^{e \times c1}$ | K$_1^{e \times c2}$ | K$_1^d$ | K$_1^{e \times d1}$ | K$_1^{e \times d2}$ | K$_1^{c \times d1}$ | K$_1^a$ | K$_1^b$ | K$_1^{c \times d2}$ | K | W |
| K$_2$ | K$_2^e$ | K$_2^c$ | K$_2^{e \times c1}$ | K$_2^{e \times c2}$ | K$_2^d$ | K$_2^{e \times d1}$ | K$_2^{e \times d2}$ | K$_2^{c \times d1}$ | K$_2^a$ | K$_2^b$ | K$_2^{c \times d2}$ | | |
| K$_3$ | K$_3^e$ | K$_3^c$ | K$_3^{e \times c1}$ | K$_3^{e \times c2}$ | K$_3^d$ | K$_3^{e \times d1}$ | K$_3^{e \times d2}$ | K$_3^{c \times d1}$ | K$_3^a$ | K$_3^b$ | K$_3^{c \times d2}$ | | |
| U | U$_e$ | U$_c$ | U$_{e \times c1}$ | U$_{e \times c2}$ | U$_d$ | U$_{e \times d1}$ | U$_{e \times d2}$ | U$_{c \times d1}$ | U$_a$ | U$_b$ | U$_{c \times d2}$ | P | |
| Q | Q$_e$ | Q$_c$ | Q$_{e \times c1}$ | Q$_{e \times c2}$ | Q$_d$ | Q$_{e \times d1}$ | Q$_{e \times d2}$ | Q$_{c \times d1}$ | Q$_a$ | Q$_b$ | Q$_{c \times d2}$ | | | expressions of symbols in Table 3 are as follows:

$$K = K_1 + K_2 + K_3 = \sum_{i=1}^{27} x_i;$$

$$W = \sum_{i=1}^{27} x_i^2;$$

$$P = \frac{K^2}{27};$$

$$U_F = \frac{\sum_{i=1}^{3} (K_i^F)^2}{3};$$

3) designing an orthogonal array header as shown in Table 3, specifying a test scheme and conducting 27 tests to obtain the test results $x_i$ (i=1, ..., 27), and calculating related statistical values;

4) determining a sum of squares of deviations, a degree of freedom, and a F value of each of the factor and an error according to an analysis of an variance table, and comparing with a critical value to determine a significance of each of the factor and the error;

TABLE 4

Analysis of the variance table of component shift timing in the pure mechanical transmission mode

| Source | Sum of squares of deviations | Degree of freedom | Mean sum of squares of deviations | F value | Critical value | Significance value | Optimal solution |
|---|---|---|---|---|---|---|---|
| E | Q$_E$ | 2 | $\frac{Q_E}{2}$ | $\frac{2Q_E}{Q_e}$ | F$_\alpha$(2,4) | | Judge the significance of the factor E |

TABLE 4-continued

Analysis of the variance table of component shift timing in the pure mechanical transmission mode

| Source | Sum of squares of deviations | Degree of freedom | Mean sum of squares of deviations | F value | Critical value | Significance value | Optimal solution |
|---|---|---|---|---|---|---|---|
| C | $Q_C$ | 2 | $\dfrac{Q_C}{2}$ | $\dfrac{2Q_C}{Q_e}$ | $F_a(2,4)$ | | Judge the significance of the factor C |
| E × C | $Q_{E \times C1} + Q_{E \times C2}$ ($Q_{E \times C}$) | 4 | $\dfrac{Q_{E \times C}}{4}$ | $\dfrac{Q_{E \times C}}{Q_e}$ | $F_a(4,4)$ | | Judge that the interaction is significant |
| D | $Q_D$ | 2 | $\dfrac{Q_D}{2}$ | $\dfrac{2Q_D}{Q_e}$ | $F_a(2,4)$ | | Judge the significance of the factor D |
| E × D | $Q_{E \times D1} + Q_{E \times D2}$ ($Q_{E \times D}$) | 4 | $\dfrac{Q_{E \times D}}{4}$ | $\dfrac{Q_{E \times D}}{Q_e}$ | $F_a(4,4)$ | | Judge that the interaction is significant |
| C × D | $Q_{C \times D1} + Q_{C \times D2}$ ($Q_{C \times D}$) | 4 | $\dfrac{Q_{C \times D}}{4}$ | $\dfrac{Q_{C \times D}}{Q_e}$ | $F_a(4,4)$ | | Judge that the interaction is significant |
| A | $Q_A$ | 2 | $\dfrac{Q_A}{2}$ | $\dfrac{2Q_A}{Q_e}$ | $F_a(2,4)$ | | Judge the significance of the factor A |
| B | $Q_B$ | 2 | $\dfrac{Q_B}{2}$ | $\dfrac{2Q_B}{Q_e}$ | $F_a(2,4)$ | | Judge the significance of the factor B |
| e* | $Q_e$ | 4 | $\dfrac{Q_e}{4}$ | | $F_a(4,4)$ | | | wherein a total sum of squares of deviations $Q_T$, a sum of squares of deviations of each factor $Q_F$, and a sum of squares of deviations of each of errors $Q_e$ are respectively:

$$Q_T = W - P = \Sigma Q_f + Q_e;$$

$$Q_F = U_F - P;$$

a total degree of freedom $f_T=26$, a degree of freedom of each factor $f_F=2$, and a degree of freedom of each of the errors $f_e=4$;

mean sums of squares of deviations of the factors and the errors are:

$$S_F^2 = \frac{Q_F}{f_F};$$

$$S_e^2 = \frac{Q_e}{f_e};$$

the F value is:

$$F_F = \frac{S_F^2}{S_e^2};$$

the analysis of the variance table of the component shift timing in the pure mechanical transmission mode is shown in Table 4:

sources of a variance mainly lie in three parts: (1) "a", "b", "c", "d", and "e"; (2) "e×c" (comprising e×c1 and e×c2), "e×d" (comprising e×d1 and e×d2), and "c×d" (comprising c×d1 and c×d2); (3) errors e*;

the $F_F$ value is compared with $F_\alpha(f_F, f_e)$ value according to a calculated sum of squares of deviations, the degree of freedom, and the mean sum of squares of deviations of each factor and the error in the sources of the variance;

if $F_F > F_\alpha(f_F, f_e)$, an influence of the factor is significant and vice versa; the factors of significant influence are selected, and an importance and the order of priority of each of the factors are intuitively analyzed to determine an optimal gear-shift solution;

the optimization solution of the gear shift in the pure mechanical transmission mode is determined by the following formulas:

$$\begin{cases} \zeta = \sum_{k=1}^{N} \mu_k \zeta_k \\ \zeta_k \in [\zeta_{kmin}, \zeta_{kmax}] \end{cases} ;$$

wherein $\xi$ is a comprehensive evaluation index, $\xi_k$ is a single evaluation index, $\xi_{kmin}/\xi_{kmax}$ is an upper/lower limit of a single evaluation index, and $\mu_k$ is the weighting coefficient;

the component shift timing of each group of the gear-shift components is controlled through shift timing data of a gear-shift mechanism obtained in the different working conditions.

8. The control method according to claim 4, wherein the hydro-mechanical hybrid transmission mode comprises a first hybrid transmission gear, a second hybrid transmission gear, a third hybrid transmission gear, and a fourth hybrid transmission gear, as follows:

in the first hybrid transmission gear, the first brake, the first clutch, and the fourth clutch are disengaged, while the second brake and the second clutch are engaged; mechanical power passes through the split mechanism ring gear and is split at the split mechanism planet carrier, a part of the mechanical power from the split mechanism planet carrier passes through the split mechanism sun gear to the hydraulic transmission assembly, the other part of the mechanical power from the split mechanism planet carrier sequentially passes through the second clutch, the front planetary-gear-set sun gear, and the front planetary-gear-set planet carrier, and the mechanical power is finally converged to and output from the output shaft;

in the second hybrid transmission gear, the second brake, the first clutch, and the fourth clutch are disengaged, while the first brake and the second clutch are engaged; mechanical power passes through the split mechanism ring gear and is split at the split mechanism planet carrier, a part of the mechanical power from the split mechanism planet carrier passes through the split mechanism sun gear to the hydraulic transmission assembly, the other part of the mechanical power from the split mechanism planet carrier sequentially passes through the second clutch and the front planetary-gear-set sun gear to the front planetary-gear-set planet carrier, the mechanical power at the front planetary-gear-set planet carrier is split into the output shaft and the front planetary-gear-set ring gear respectively, the mechanical power at the front planetary-gear-set ring gear is sequentially transmitted to the rear planetary-gear-set planet carrier and the rear planetary-gear-set ring gear, and the split three all split parts of the mechanical power are finally converged to the output shaft;

in the third hybrid transmission gear, the first brake, the second brake, and the fourth clutch are disengaged, while the first clutch and the second clutch are engaged; mechanical power passes through the split mechanism ring gear and is split at the split mechanism planet carrier, a part of the mechanical power from the split mechanism planet carrier passes through the split mechanism sun gear to the hydraulic transmission assembly, the other part of the mechanical power is input from the split mechanism planet carrier to the second clutch, then split into the front planetary-gear-set ring gear and the front planetary-gear-set sun gear respectively, and converged at the front planetary-gear-set planet carrier, and the mechanical power in the mechanical transmission assembly and the mechanical power in the hydraulic transmission assembly are converged and output from the output shaft;

in the fourth hybrid transmission gear, the first brake, the first clutch, and the second clutch are disengaged, while the second brake and the fourth clutch are engaged; mechanical power passes through the split mechanism ring gear and is split at the split mechanism planet carrier, a part of the mechanical power from the split mechanism planet carrier passes through the split mechanism sun gear to the hydraulic transmission assembly, the other part of the mechanical power from the split mechanism planet carrier sequentially passes through the fourth clutch, the rear planetary-gear-set sun gear, and the rear planetary-gear-set ring gear to the output shaft, and the mechanical power in the mechanical transmission assembly and the mechanical power in the hydraulic transmission assembly are converged to and output from the output shaft.

9. The control method according to claim 8, wherein during a gear shift in the hydro-mechanical hybrid transmission mode, a gear shift from the first hybrid transmission gear to the second hybrid transmission gear involves two gear-shift components, a gear shift from the second hybrid transmission gear to the third hybrid transmission gear involves two gear-shift components, a gear shift from the third hybrid transmission gear to the fourth hybrid transmission gear involves four gear-shift components, a gear shift from the first hybrid transmission gear to the third hybrid transmission gear involves two gear-shift components, a gear shift from the second hybrid transmission gear to the fourth hybrid transmission gear involves two gear-shift components, and a gear shift from the second hybrid transmission gear to the fourth hybrid transmission gear involves four gear-shift components;

as for gear shifts involving two or less gear-shift components, an optimization solution is derived from not more than three tests; as for gear shifts involving three or four gear-shift components with no interaction, an orthogonal array is used for analysis; as for gear shifts involving four gear-shift components, four columns of the orthogonal array are made full use of; as for gear shifts involving three gear-shift components, any three columns of the orthogonal array are selected;

a variation, a change rate, a quadratic differential and a time of an angular velocity of the output shaft are determined as evaluation indexes, "advance", "on-time", and "delay" shifts are selected as three levels, and an orthogonal analysis with interaction is performed; test data are acquired through tests; a sum of squares of deviations and a degree of freedom of each factor and error are determined according to an analysis of variance table and are compared with a critical value, to determine a significance of each of the factor and error; a solution of each of the evaluation indexes is obtained, and the optimization solution is determined according to a weighting coefficient; and shift timing data of a gear-shift mechanism obtained in different working conditions are grouped and used for controlling a shift timing of each group of the gear-shift components.

10. The control method according to claim 9, wherein the gear shift in the hydro-mechanical hybrid transmission mode is controlled by the control method comprising the following steps:

1) selecting a variation $\alpha$, a change rate $\beta$, and a quadratic differential $\gamma$ and a time t of the angular velocity of the output shaft as the evaluation indexes, wherein $\alpha$, $\beta$, and $\gamma$ are respectively zero-order, first-order, and second-order differentials of the rotation speed and are together with the time t to form spatio-temporal evaluation indexes;

the variation of the angular velocity of the output shaft is defined as:

$$\alpha = |\bar{\omega}_0 - \omega_{0\ min}|;$$

wherein $\alpha$ is the variation of the angular velocity of the output shaft $\bar{\omega}_0$ is a steady-state angular velocity of the output shaft, and $\omega_{0\ min}$ is a minimum angular velocity of the output shaft;

the change rate of the angular velocity of the output shaft is defined as:

$$\beta = \frac{d\omega}{dt};$$

wherein $\beta$ is the change rate of the angular velocity of the output shaft;

a torque of the output shaft is:

$$T_0 = \beta \cdot J_0;$$

wherein $T_0$ is the torque of the output shaft, and $J_0$ is a rotational inertia of the output shaft;

the quadratic differential of the angular velocity of the output shaft is:

$$\gamma = \frac{d\beta}{dt} = \frac{d^2\omega}{dt^2};$$

wherein $\gamma$ is the quadratic differential of the angular velocity of the output shaft;

a jerk is a change rate of a longitudinal acceleration of a vehicle:

$$j = \frac{r_d}{i_g i_0}\gamma;$$

wherein j is the jerk, $r_d$ is a tire power radius, $i_g$ is a gear ratio, and $i_0$ is a drive axle ratio;

2) establishing an $L_9(3^4)$ orthogonal array as shown in Table 2, wherein "1", "2", and "3" are three levels, respectively representing "advance", "on-time", and "delay" shifts of related gear-shift components; "a", "b", "c", and "d" are four factors, respectively representing gear-shift components with no interaction; n is a total number of tests, n=9, and $K_i^F$ is a sum of test results related to an $i_{th}$ level of a factor (i$\epsilon$(1,2,3), F$\epsilon$(a, b, c, d));

TABLE 2

Orthogonal array of component shift timing in the hydro-mechanical hybrid transmission mode

| | a<br>1 | b<br>2 | c<br>3 | d<br>4 | Test result<br>$x_i$ |
|---|---|---|---|---|---|
| 1 | 1 | 1 | 1 | 1 | |
| 2 | 1 | 2 | 2 | 2 | |
| 3 | 1 | 3 | 3 | 3 | |
| 4 | 2 | 1 | 2 | 3 | |
| 5 | 2 | 2 | 3 | 1 | |
| 6 | 2 | 3 | 1 | 2 | |
| 7 | 3 | 1 | 3 | 2 | |
| 8 | 3 | 2 | 1 | 3 | |
| 9 | 3 | 3 | 2 | 1 | | an expression of symbols in Table 2 is as follows:

$$k_i^F = \frac{K_i^F}{3};$$

a range is:

$$R^F = \max\left\{|k_i^F - k_j^F|\right\};$$

an order of priority of the four factors is determined through data of the range, a preferred solution of each of the evaluation indexes is determined, and finally the optimization solution is determined according to the weighting coefficient;

the optimization solution is determined by:

$$\begin{cases} \zeta = \sum_{k=1}^{N} \lambda_k \zeta_k \\ \zeta_k \in [\zeta_{kmin}, \zeta_{kmax}] \end{cases};$$

wherein $\xi$ is a comprehensive evaluation index, $\xi_k$ is a single evaluation index, $\xi_{kmin}/\xi_{kmax}$ is an upper/lower limit of a single evaluation index, and $\lambda_k$ is the weighting coefficient;

3) designing an orthogonal array header, specifying a test scheme, and conducting 9 tests to obtain the test results;

4) calculating the range according to the test results, determining the order of priority of the four factors, obtaining the preferred solution of each evaluation index $\xi_k$, and determining the optimization solution according to the weighting coefficient $\lambda_k$;

wherein the optimization solution of the gear shift in the hydro-mechanical hybrid transmission mode is determined by the following formulas:

$$\begin{cases} \zeta = \sum_{k=1}^{N} \lambda_k \zeta_k \\ \zeta_k \in [\zeta_{kmin}, \zeta_{kmax}] \end{cases};$$

wherein $\xi$ is the comprehensive evaluation index, $\xi_k$ is the single evaluation index, $\xi_{kmin}/\xi_{kmax}$ is the upper/lower limit of the single evaluation index, and $\lambda_k$ is the weighting coefficient;

5) if the optimization solution does not meet a requirement, increasing or reducing the "advance" time and "delay" time, or selecting a different "advance" time and "delay" time, until the optimization solution meets the requirement;

6) controlling the shift timing of each group of the gear-shift components through the shift timing data of the gear-shift mechanism obtained in the different working conditions.

11. The hydro-mechanical hybrid transmission device with multiple power distribution modes according to claim 1, wherein the split mechanism comprises a split brake, a split mechanism sun gear, a split mechanism planet carrier, and a split mechanism ring gear, wherein the input shaft is connected to the split mechanism ring gear, the split mechanism sun gear is connected to the hydraulic transmission assembly, the split brake is arranged on the split mechanism sun gear, and the split mechanism planet carrier is connected to the mechanical transmission assembly.

* * * * *